United States Patent
Okada et al.

(10) Patent No.: US 11,760,076 B2
(45) Date of Patent: Sep. 19, 2023

(54) METHOD FOR MANUFACTURING LAYERED FILM, AND METHOD FOR MANUFACTURING LAYERED MEMBER

(71) Applicant: NIPPON PAINT AUTOMOTIVE COATINGS CO., LTD., Osaka (JP)

(72) Inventors: Takuma Okada, Hirakata (JP); Takamitsu Watanabe, Hirakata (JP); Takeki Hosokawa, Hirakata (JP); Kei Takigawa, Hirakata (JP); Kazuhito Kobayashi, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 17/629,927

(22) PCT Filed: Jul. 22, 2020

(86) PCT No.: PCT/JP2020/028554
§ 371 (c)(1),
(2) Date: Jan. 25, 2022

(87) PCT Pub. No.: WO2021/020302
PCT Pub. Date: Feb. 4, 2021

(65) Prior Publication Data
US 2022/0288914 A1    Sep. 15, 2022

(30) Foreign Application Priority Data

Jul. 26, 2019   (JP) .................................. 2019-138314

(51) Int. Cl.
*B32B 37/24*   (2006.01)
*B32B 37/10*   (2006.01)
*B32B 38/00*   (2006.01)

(52) U.S. Cl.
CPC .............. *B32B 37/24* (2013.01); *B32B 37/10* (2013.01); *B32B 38/0008* (2013.01);
(Continued)

(58) Field of Classification Search
CPC ...... B32B 2310/0806; B32B 2307/732; B32B 2307/536; B32B 2307/416;
(Continued)

(56) References Cited

U.S. PATENT DOCUMENTS

| | | | |
|---|---|---|---|
| 2003/0008162 A1* | 1/2003 | Oya ........................ | C08K 5/353 428/480 |
| 2006/0269724 A1 | 11/2006 | Ohashi et al. | |
| 2020/0223150 A1 | 7/2020 | Kajiya et al. | |

FOREIGN PATENT DOCUMENTS

| | | |
|---|---|---|
| JP | 2000-214302 | 8/2000 |
| JP | 2002-258760 | 9/2002 |

(Continued)

OTHER PUBLICATIONS

International Preliminary Report on Patentability and Written Opinion of the International Searching Authority dated Feb. 1, 2022 in International (PCT) Application No. PCT/JP2020/028554.
(Continued)

*Primary Examiner* — Vishal I Patel
(74) *Attorney, Agent, or Firm* — Wenderoth, Lind & Ponack, L.L.P.

(57) ABSTRACT

Provided is a method for manufacturing a laminated film that can be molded into a complicated shape. A method for manufacturing a laminated film comprising: a step of forming an uncured hard coat layer by applying an active energy-ray curable composition for forming a hard coat layer to one side of a first support substrate having a thickness of 50 μm or more and 600 μm or less, and then drying the composition; a step of forming an uncured optical
(Continued)

interference layer by applying an active energy-ray curable composition for forming a optical interference layer on one surface of a second support substrate so that the thickness of the uncured optical interference layer is between 15 nm or more and 200 nm or less, and then drying the composition; and a lamination step of laminating a surface of the uncured hard coat layer opposite the first support substrate and a surface of the uncured optical interference layer opposite the second support substrate to obtain a laminated film, wherein a stretch ratio of the laminated film at 160° C. is 50% or more.

8 Claims, 1 Drawing Sheet

(52) U.S. Cl.
CPC ...... *B32B 38/164* (2013.01); *B32B 2037/243* (2013.01); *B32B 2305/77* (2013.01); *B32B 2307/416* (2013.01); *B32B 2307/536* (2013.01); *B32B 2307/732* (2013.01); *B32B 2310/0806* (2013.01)

(58) Field of Classification Search
CPC .......... B32B 2305/77; B32B 2037/243; B32B 38/164; B32B 38/0008; B32B 37/10; B32B 37/24
See application file for complete search history.

(56) References Cited

FOREIGN PATENT DOCUMENTS

| JP | 2003-236969 | 8/2003 |
| JP | 2015-4937 | 1/2015 |
| JP | 2019-14247 | 1/2019 |
| WO | 2004/113966 | 12/2004 |
| WO | 2011/058904 | 5/2011 |

OTHER PUBLICATIONS

International Search Report (ISR) dated Sep. 29, 2020 in International (PCT) Application No. PCT/JP2020/028554.
Extended European Search Report dated Jul. 5, 2023 issued in European Application No. 20847200.1.

* cited by examiner

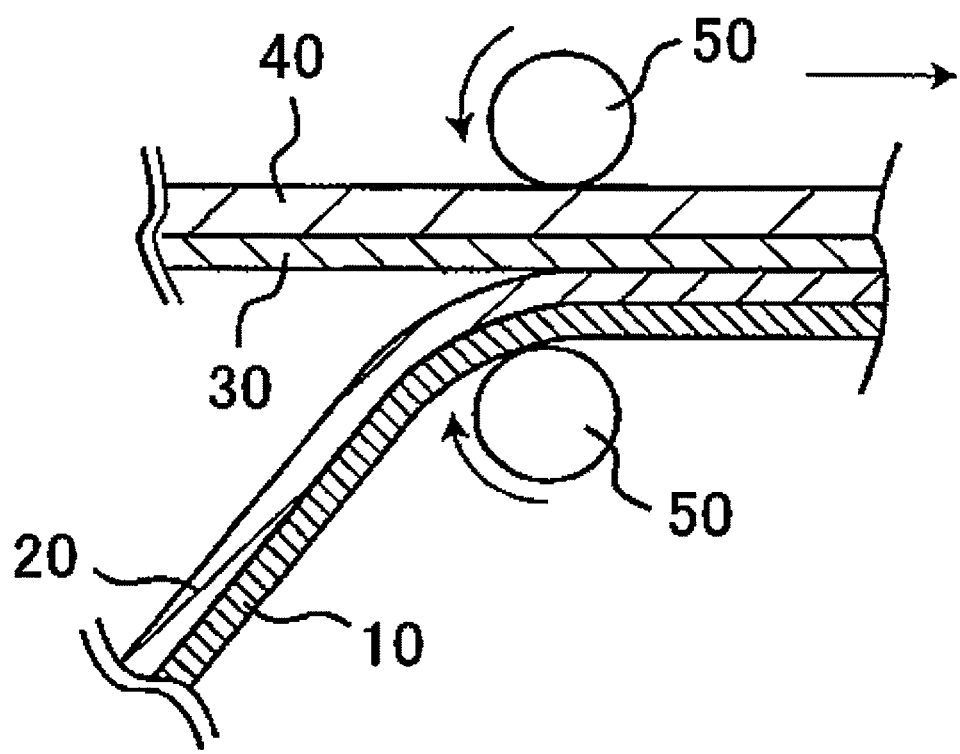

METHOD FOR MANUFACTURING LAYERED FILM, AND METHOD FOR MANUFACTURING LAYERED MEMBER

TECHNICAL FIELD

The present invention relates to a method for manufacturing a laminated film and a method for manufacturing a laminated member.

Displays are used in a wide variety of fields such as computers, televisions, cellular phones, portable information terminal devices (tablet personal computers, mobile devices, electronic notebooks, etc.), and automobile display panels such as digital meters, instrument panels, navigation devices, console panels, center clusters and heater control panels. Such products are often covered with a protective material. The protective material is usually obtained by molding a film having a hard coat layer.

The protective material of a display may be further provided with a low refractive index layer for the purpose of reducing the reflectance of the viewing-side surface.

JP 2015-004937 A (Patent Document 1) teaches a laminated film in which a hard coat layer and a low refractive index layer (an optical interference layer) are sequentially laminated on a transparent support.

CITATIONS LIST

Patent Literature

Patent Literature 1: JP 2015-004937 A

SUMMARY OF THE INVENTION

Technical Problems

In recent years, displays have been molded into various shapes according to purposes such as applications and designability. So, a protective material of a display is also required to be molded into a complicated shape. However, it is difficult to mold the laminated film described in Patent Document 1 into a complicated shape.

The present invention solves the above conventional problems, and an object thereof is to provide a laminated film that can be molded even in a complicated shape.

In order to solve the above-described problems, the present invention provides the following embodiments.

[1]
A method for manufacturing a laminated film comprising:
a step of forming an uncured hard coat layer by applying an active energy-ray curable composition for forming a hard coat layer to one side of a first support substrate having a thickness of 50 μm or more and 600 μm or less, and then drying the composition;
a step of forming an uncured optical interference layer by applying an active energy-ray curable composition for forming a optical interference layer on one surface of a second support substrate so that the thickness of the uncured optical interference layer is between 15 nm or more and 200 nm or less, and then drying the composition; and
a lamination step of laminating a surface of the uncured hard coat layer opposite the first support substrate and a surface of the uncured optical interference layer opposite the second support substrate to obtain a laminated film, wherein
a stretch ratio of the laminated film at 160° C. is 50% or more.

[2]
The method for manufacturing a laminated film according to [1] above, wherein
a luminous reflectance including regular reflected light measured from an uncured optical interference layer side of the laminated film is 0.1% or more and 4.0% or less, or 6.0% or more and 10.0% or less.

[3]
The method for manufacturing a laminated film according to [1] or [2] above, wherein
a surface tension $\gamma 2$ of the one surface of the second support substrate, a surface tension $\gamma L_1$ of the uncured optical interference layer, and a surface tension $\gamma H_1$ of the uncured hard coat layer satisfy relationships of the following formulas 1 and 2:

$$\gamma 2 \leq \gamma L_1 \qquad \text{(Formula 1)}$$

$$|\gamma 2 - \gamma L_1| > |\gamma H_1 - \gamma L_1| \qquad \text{(Formula 2)}$$

[4]
The method for manufacturing a laminated film according to any one of [1] to [3] above, wherein
a hardness HHb of the uncured hard coat layer measured by a nanoindentation method is 0.1 GPa or more and 0.4 GPa or less.

[5]
The method for manufacturing a laminated film according to any one of [1] to [4] above, wherein
a surface tension $\gamma 2$ of the one surface of the second support substrate is 28 mN/m or more and 45 mN/m or less.

[6]
The method for manufacturing a laminated film according to any one of [1] to [5] above, wherein
a surface tension $\gamma H_1$ of the uncured hard coat layer is 40 mN/m or more.

[7]
The method for manufacturing a laminated film according to any one of [1] to [6] above, wherein
a hardness HLa measured by a nanoindentation method from the optical interference layer side of the laminated film irradiated with an active energy ray having an integral light quantity of 500 mJ/cm$^2$ is more than 0.5 GPa and 1.2 GPa or less.

[8]
The method for manufacturing a laminated film according to any one of [1] to [7] above, wherein
in the step of forming the uncured hard coat layer, the composition for forming a hard coat layer is applied such that a thickness of the uncured hard coat layer is 2 μm or more and 30 μm or less.

[9]
A method for manufacturing a laminated member comprising:
a step of preparing the laminated film according to any one of [1] to [8] above; and
a step of irradiating the laminated film with an active energy ray having an integral light quantity of 100 m/cm$^2$ or more.

Advantageous Effects of Invention

According to the present invention, a laminated film that can be molded into a complicated shape is provided.

BRIEF DESCRIPTION OF THE DRAWINGS

FIG. 1 is a schematic view illustrating a part of a lamination step according to the present invention.

DESCRIPTION OF EMBODIMENTS

As a protective film for a display, a laminated film called a precure type may be used. A hard coat layer and an optical interference layer contained in a precure type laminated film are usually cured in a step before a preform step, that is, in a step of forming each layer as disclosed in Patent Document 1. So, in the preform, the laminated film cannot follow a mold in a complicated shape, and cracks may occur in the laminated film.

In order to make the pre-cured laminated film follow the mold, the cross-link density of the laminated film can be reduced. However, a low crosslink density makes it difficult to obtain sufficient hard coating performance. The hard coat performance is, for example, high hardness, abrasion resistance, and chemical resistance.

From such a viewpoint, it has conceived that a hard coat layer and an optical interference layer are not cured in a process of manufacturing a laminated film. However, when an uncured optical interference layer is applied on an uncured hard coat layer, both components may be mixed to generate a mixed phase. Since the mixed phase lowers the function of the optical interference layer, desired reflectivity cannot be obtained.

Thus, in the present invention, the uncured hard coat layer and the uncured optical interference layer are dried and then bonded together. Drying removes at least part of the solvent that may be contained in the layer-forming composition. Thus, although each layer is uncured, movement of non-volatile components between layers is suppressed, so that appearance of a mixed phase is suppressed. Accordingly, the laminated film can exhibit desired reflectivity.

Further, the dried hard coat layer and the dried optical interference layer have a certain hardness. Thus, each layer exhibits a certain resistance force against external stress despite being uncured. That is, damage to the laminated film is suppressed. In the process of manufacturing the laminated member, external stress is likely to be applied to the laminated film. For example, in a printing process, squeegee marks or suction marks are easily formed.

The laminated film comprising an uncured hard coat layer and an uncured optical interference layer is of an after-cure type. Since the after-cure type laminated film is subjected to a preform step in an uncured state, it can be molded into a complicated shape without generating cracks. Since the occurrence of cracks is suppressed, an outward appearance of a laminated member is improved, and hard coat performance and desired reflectivity are effectively exhibited.

Furthermore, since there is no need to stretch after curing, each layer can be formed of a layer-forming composition having a high crosslinking density. That is, the hardness of each layer after curing can be further increased. Thus, the hard coat performance of the laminated member can be easily improved.

In addition, advantages derived from the fact that both the hard coat layer and the optical interference layer to be bonded are uncured include the following.

Even by a lamination method, both layers can be strongly adhered to each other. For this reason, it is not necessary to use a pressure-sensitive adhesive or an adhesive or to perform surface treatment in bonding process of the two layers. Accordingly, the transparency of the laminated film is improved, and whitening is also suppressed. Furthermore, decrease in reflectance caused by migration of components of a pressure-sensitive adhesive or the like to the optical interference layer, generation of aggregates, etc. are suppressed. As a result, the visibility of the display through the cured product of the laminated film (that is, the laminated member) is hardly impaired. In addition, the cost is reduced and the productivity is improved.

The term "uncured" refers to a state in which the resin is not completely cured. The hard coat layer and the optical interference layer contained in the laminated film may be in a semi-cured state.

The term "cured" is synonymous with "dry through" defined in JIS K 5500 (glossary of terms for coating materials). That is, the term "cured" means a) when the center of a test piece is strongly sandwiched between the thumb and the forefinger, no dent due to the fingerprint is formed on the coating surface and no movement of the coating film is noticed, and when the coating surface is rapidly rubbed repeatedly with the fingertip, a dry hard state in which no scratch marks are formed is obtained.

The hard coat layer and the optical interference layer irradiated with an active energy ray having an integral light quantity of 100 mJ/cm$^2$ can be said to be cured.

Likewise, the term "semi-cured" is synonymous with "dry to touch" defined in JIS K 5500 (glossary of terms for coating materials). That is, the term "semi-cured" refers to when the center of a painted surface is lightly rubbed with a fingertip and the painted surface is in a dry to touch state with no rubbing marks. The hard coat layer and the optical interference layer irradiated with an active energy ray having an integral light quantity of 1 mJ/cm$^2$ or more and less than 100 mJ/cm$^2$ can be said to be semi-cured.

The term "uncured" refers to a state in which the hard coat layer and the optical interference layer are not exposed to active energy rays or are exposed to active energy rays having an integral light quantity of less than 1 mJ/cm$^2$.

A. Method for Manufacturing Laminate Film

A laminated film is manufactured by a method comprising a step of forming an uncured hard coat layer by applying an active energy-ray curable composition for forming a hard coat layer to one side of a first support substrate having a thickness of 50 μm or more and 600 μm or less, and then drying the composition, a step of forming an uncured optical interference layer by applying an active energy-ray curable composition for forming a optical interference layer on one surface of a second support substrate so that the thickness of the uncured optical interference layer is between 15 nm or more and 200 nm or less, and then drying the composition, and a lamination step of laminating a surface of the uncured hard coat layer opposite the first support substrate and a surface of the uncured optical interference layer opposite the second support substrate to obtain a laminated film.

(1) Step of Forming Uncured Hard Coat Layer

An active energy ray-curable composition for forming a hard coat layer (hereinafter may be referred to as composition HC) is applied to one surface of a first support substrate, and then dried. Thanks to this, at least part of the solvent that may be contained in the composition HC is removed, so that an uncured hard coat layer is formed.

The thickness of the first support substrate is 50 μm or more and 600 μm or less. Thanks to this, even when the laminated film is stretched, the laminated film can maintain rigidity. In addition, warping of the laminated film during curing and after curing is easily suppressed. The thickness of the first support substrate is preferably 100 μm or more, and more preferably 200 μm or more. The thickness of the first support substrate is preferably 500 μm or less, more preferably 480 μm or less, even more preferably 450 μm or less, and particularly preferably 400 μm or less.

The first support substrate on which the uncured hard coat layer is formed may be wound into a roll form. When the thickness of the first support substrate is within the above range, the first support substrate can be wound into a roll form. Accordingly, roll-to-roll processing can be performed until the lamination step.

The first support substrate also may be wound after a protective film is bonded to the surface of the uncured hard coat layer. Examples of the protective film include those of the second support substrate described later. The protective film and the uncured hard coat layer may be bonded to each other with an adhesive layer interposed therebetween.

The composition HC can be prepared by a method commonly practiced by one skilled in the art. For example, it can be prepared by mixing the components thereof using a commonly used mixing device such as a paint shaker and a mixer.

The method of the application of the composition HC is not particularly limited, and the application is performed by a method usually performed by one skilled in the art. Examples of the application method include a dip coating method, an air knife coating method, a curtain coating method, a roller coating method, a bar coating method (e.g., a wire bar coating method), a die coating method, an inkjet method, a gravure coating method, or an extrusion coating method (U.S. Pat. No. 2,681,294). Among them, a gravure coating method or a die coating method is preferable in that a thin and highly smooth layer is easily formed.

The drying method is not particularly limited as long as at least part of the solvent that may be contained in the composition HC is removed. Examples of the drying method include air drying (natural drying), heat drying, and vacuum drying. Among them, heat drying is preferable. By heating, the uncured hard coat layer can be leveled along with being dried. Accordingly, adhesion to the uncured optical interference layer is easily more improved.

The drying is performed after the uncured hard coat layer is formed on the first support substrate and before the uncured hard coat layer is subjected to a lamination step. For example, the uncured hard coat layer is dried before the first support substrate with the uncured hard coat layer is carried into a lamination machine.

The drying temperature is, for example, 20° C. or higher and 140° C. or lower. The drying temperature is preferably 30° C. or higher, more preferably 40° C. or higher, and particularly preferably 60° C. or higher. The drying temperature is preferably 120° C. or lower, and more preferably 100° C. or lower. The drying time is, for example, 10 seconds or more and 10 minutes or less. The drying time is preferably 20 seconds or more, and more preferably 30 seconds or more. The drying time is preferably 5 minutes or less, and more preferably 3 minutes or less.

The hard coat layer to be formed in this step is not particularly limited in thickness. In this step, the composition HC is applied such that the thickness of the uncured hard coat layer is, for example, 2 μm or more and 30 μm or less. The uncured hard coat layer is a dried and uncured hard coat layer (hereinafter, simply referred to as uncured hard coat layer). When the uncured hard coat layer has such a thickness, warpage after curing is easily suppressed. In addition, a hard coat layer having superior hard coat performance is obtained.

The thickness of the uncured hard coat layer is more preferably 3 μm or more. The thickness of the uncured hard coat layer is more preferably 25 μm or less, and particularly preferably 20 μm or less.

The uncured hard coat layer is not particularly limited in surface tension $\gamma H_1$. The surface tension $\gamma H_1$ is preferably 40 mN/m or more from the viewpoint of easily improving adhesion to the uncured optical interference layer. The surface tension $\gamma H_1$ is preferably 41 mN/m or more, and more preferably 42 mN/m or more. The surface tension $\gamma H_1$ is preferably 50 mN/m or less, more preferably 49 mN/m or less, and particularly preferably 48 mN/m or less.

The uncured hard coat layer preferably has a hardness HHb of 0.1 GPa or more and 0.4 GPa or less measured by a nanoindentation method. When the hardness HHb is 0.1 GPa or more, the occurrence of defective appearance such as squeegee marks in a post-process such as printing is easily suppressed. When the hardness HHb is 0.4 GPa or less, the uncured hard coat layer exhibits appropriate tackiness, so that the bonding property with the uncured optical interference layer is easily improved. The hardness HHb may be 0.15 GPa or more, and may be 0.2 GPa or more.

The hardness of the uncured hard coat layer is, for example, a maximum value of hardness calculated from a value measured by a nanoindentation method within a range of 30 nm or more and 100 nm or less from the surface of the uncured hard coat layer.

The hardness by the nanoindentation method is determined by, for example, continuous stiffness measurement using a nanoindentation device. In the continuous stiffness measurement, a minute load (alternating current (AC) load) is applied to a sample in addition to a quasi-static test load (direct current (DC) load). Thanks to this, the force applied to the sample slightly vibrates. Stiffness with respect to depth is calculated from the vibration component of the resulting displacement and the phase difference between the displacement and the load. Thanks to this, a continuous profile of hardness with respect to depth can be obtained.

For the continuous stiffness measurement, for example, Advanced Dynamic E and H. NMT method can be used. As the nanoindentation device, iMicro Nanoindenter manufactured by NANOMECHANICS, INC., can be used. In this case, the load and the stiffness can be calculated using dedicated software for iMicro. A load is applied to the sample by the indenter until the load reaches a maximum load of 50 mN. As the indenter, for example, a berkovich type diamond indenter is used. In the measurement and the calculation of stiffness, the Poisson's ratio of the coating layer, the load, etc. may be appropriately set to appropriate values.

(2) Step of Forming Uncured Optical Interference Layer

An active energy-ray curable composition for forming a optical interference layer (hereinafter may be referred to as composition R) is applied to one surface of a second support substrate, and then dried. Thanks to this, at least part of the solvent that may be contained in the composition R is removed, so that an uncured optical interference layer is formed.

The second support substrate on which the uncured optical interference layer is formed may be wound into a roll form. Thanks to this, roll-to-roll processing can be performed until the lamination step.

The second support substrate also may be wound after a protective film is bonded to the surface of the uncured optical interference layer. Examples of the protective film include those of the second support substrate described later.

The protective film and the uncured optical interference layer may be bonded to each other with an adhesive layer interposed therebetween.

The composition R can be prepared by the same method as the composition HC. The method for applying the composition R is not particularly limited, and the composition R is applied by the same method as the composition HC. Among them, a gravure coating method or a die coating method is preferable in that a thin and highly smooth layer is easily formed.

The drying method is not particularly limited as long as at least part of the solvent that may be contained in the composition R is removed. Examples of the drying method include the same methods for the drying of the hard coat layer. Among them, heat drying is preferable. By heating, the uncured optical interference layer can be leveled along with being dried.

The drying is performed after the uncured optical interference layer is formed on the second support substrate and before the uncured optical interference layer is subjected to the lamination step. For example, the uncured optical interference layer is dried before the second support substrate with the uncured optical interference layer is carried into a lamination machine.

The drying temperature is, for example, 20° C. or higher and 140° C. or lower. The drying temperature is preferably 30° C. or higher, more preferably 40° C. or higher, and particularly preferably 60° C. or higher. The drying temperature is preferably 120° C. or lower, and more preferably 100° C. or lower. The drying time is, for example, 10 seconds or more and 10 minutes or less. The drying time is preferably 20 seconds or more, and more preferably 30 seconds or more. The drying time is preferably 5 minutes or less, and more preferably 3 minutes or less.

The composition R is applied such that the thickness of the optical interference layer to be formed in this step is 15 nm or more and 200 nm or less. The optical interference layer to be formed in this step is a dried and uncured optical interference layer (hereinafter simply referred to as uncured optical interference layer). Thanks to this, desired reflectivity is exhibited.

The optical interference effect is greatly affected by the thickness of the optical interference layer. For this reason, it is important to control the thickness of the optical interference layer. In the present embodiment, the hard coat layer and the optical interference layer are laminated together by a lamination method. Accordingly, it is possible to form a uniform optical interference layer having a desired thickness without being affected by the surface condition of the hard coat layer.

The thickness of the uncured optical interference layer is preferably 40 nm or more, and more preferably 60 nm or more. The thickness of the uncured optical interference layer is preferably 180 nm or less, and more preferably 150 nm or less.

From the viewpoint that an optical interference layer having the above thickness is easily formed uniformly on the second support substrate, the surface tension $\gamma L_0$ of the composition R is preferably equal to or less than the surface tension $\gamma 2$ of the second support substrate's surface to which the composition R is to be applied (hereinafter, the surface is referred to as application surface) ($\gamma 2 \geq \gamma L_0$).

The difference between the surface tension $\gamma L_0$ and the surface tension $\gamma 2$ (=$\gamma 2 - \gamma L_0$) is not particularly limited. $\gamma 2 - \gamma L_0$ is preferably 1 mN/m or more, and more preferably 20 mN/m or more from the viewpoint that the composition R is more easily wetted and spread.

The second support substrate is not particularly limited in surface tension $\gamma 2$. The surface tension $\gamma 2$ is, for example, 28 mN/m or more and 50 mN/m or less. The surface tension $\gamma 2$ is preferably 30 mN/m or more, and more preferably 32 mN/m or more. The surface tension $\gamma 2$ is preferably 45 mN/m or less, more preferably 40 mN/m or less, and particularly preferably 36 mN/m or less.

The composition R is not particularly limited in surface tension $\gamma L_0$. The surface tension $\gamma L_0$ is preferably 20 mN/m or more and 35 mN/m or less. Thanks to this, the composition R is more easily wetted and spread, so that a uniform optical interference layer is easily formed. The surface tension $\gamma L_0$ is more preferably 20 mN/m or more, even more preferably 21 mN/m or more, and particularly preferably 22 mN/m or more. The surface tension $\gamma L_0$ is more preferably 35 mN/m or less, even more preferably 32 mN/m or less, and particularly preferably 30 mN/m or less.

The second support substrate supports the uncured optical interference layer, and functions as a release paper for molding the composition R into a film form and as a protective film for protecting the optical interference layer and the laminated film. Thus, the second support substrate is usually peeled off from the uncured optical interference layer after the laminated film is manufactured or after the laminated film is molded.

From the viewpoint that the second support substrate is easily peeled off, the surface tension $\gamma L_1$ of the uncured optical interference layer is preferably equal to or more than the surface tension $\gamma 2$ of the application surface of the second support substrate ((Formula 1) $\gamma 2 \leq \gamma L_1$), and the surface tension $\gamma L_1$ of the uncured optical interference layer is more preferably larger than the surface tension $\gamma 2$ of the application surface of the second support substrate ($\gamma 2 < \gamma L_1$). In this case, excessive adhesion between the uncured optical interference layer and the second support substrate is suppressed, and the second support substrate can be easily peeled off from the uncured optical interference layer after the lamination step.

The difference between the surface tension $\gamma L_1$ and the surface tension $\gamma 2$ (=$|\gamma 2 - \gamma L_1|$) is not particularly limited. From the viewpoint that the second support substrate is more easily peeled off, $|\gamma 2 - \gamma L_1|$ is preferably more than 3 mN/m and less than 20 mN/m. When $|\gamma 2 - \gamma L_1|$ is in this range, part of the optical interference layer is easily suppressed from peeling off together with the second support substrate when the second support substrate is peeled off. $|\gamma 2 - \gamma L_1|$ is more preferably 5 mN/m or more, and even more preferably 7 mN/m or more. $|\gamma 2 - \gamma L_1|$ is more preferably 18 mN/m or less, and even more preferably 16 mN/m or less.

In order to suppress partial peeling of the uncured optical interference layer, the relationship between the surface tension $\gamma H_1$ of the uncured hard coat layer and the surface tension $\gamma L_1$ of the uncured optical interference layer (the uncured optical interference layer disposed adjacent to the uncured hard coat layer) is also important. Specifically, it is preferable that the difference ($|\gamma H_1 - \gamma L_1|$) between the surface tension $\gamma L_1$ and the surface tension $\gamma H_1$ is small. In this case, the uncured optical interference layer is hardly peeled off from the uncured hard coat layer.

The difference between the surface tension $\gamma H_1$ and the surface tension $\gamma L_1$ (=$|\gamma H_1 - \gamma L_1|$) is not particularly limited. From the viewpoint of easily suppressing peeling of the uncured optical interference layer, $|\gamma H_1 - \gamma L_1|$ is preferably less than 15 mN/m, more preferably 10 mN/m or less, and particularly preferably 0 mN/m.

Furthermore, the relationship between the difference between the surface tension $\gamma L_1$ and the surface tension $\gamma 2$ ($=|\gamma 2-\gamma L_1|$) and the difference between the surface tension $\gamma H_1$ and the surface tension $\gamma L_1$ ($=|\gamma H_1-\gamma L_1|$) is also important. Specifically, it is preferable that $\gamma 2-\gamma L_1$ is larger than $\gamma H_1-\gamma L_1$ ((Formula 2) $|\gamma 2-\gamma L_1|>|\gamma H_1-\gamma L_1|$).

The difference between $|\gamma 2-\gamma L_1|$ and $|\gamma H_1-\gamma L_1|$ is not particularly limited. ($|\gamma 2-\gamma L_1|-|\gamma H_1-\gamma L_1|$) is preferably more than 1 mN/m and less than 30 mN/m. ($\gamma 2-\gamma L_1|-|\gamma H_1-\gamma L_1|$) is more preferably 3 mN/m or more. ($|\gamma 2-\gamma L_1|-|\gamma H_1-\gamma L_1|$) is more preferably 5 mN/m or less.

When (Formula 2) $|\gamma 2-\gamma L_1|>|\gamma H_1-\gamma L_1|$ is satisfied, the second support substrate can be easily peeled off from the uncured optical interference layer, while the uncured optical interference layer is easily suppressed from being peeled off from the uncured hard coat layer. More preferably, (Formula 1) $\gamma 2 \leq \gamma L_1$ is satisfied together with (Formula 2) $|\gamma 2-\gamma L_1|>|\gamma H_1-\gamma L_1|$.

The hardness HLb of the uncured laminated film measured by a nanoindentation method may be 0.1 GPa or more and 0.5 GPa or less. Thanks to this, when the hardness HLb is 0.1 GPa or more, the occurrence of defective appearance such as squeegee marks in a post-process such as printing is easily suppressed. The hardness HLb may be 0.15 GPa or more, and may be 0.2 GPa or more.

The hardness of the laminated film is increased by curing. Thus, the resulting laminated member has superior hard coat performance.

The hardness HLa measured by a nanoindentation method from the optical interference layer side of the laminated film irradiated with an active energy ray having an integral light quantity of 500 mJ/cm$^2$ is preferably more than 0.5 GPa and 1.2 GPa or less. The hardness HLa may be 0.6 GPa or more, and may be 0.7 GPa or more.

When the hardness HLb is 0.5 GPa, the hardness HLa is, for example, more than 0.5 GPa and 1.2 GPa or less. The hardness HLa may be more than 0.7 GPa and 1.2 GPa or less.

When the hardness HLb is 0.4 GPa, the hardness HLa is, for example, more than 0.4 GPa and 1.2 GPa or less. The hardness HLa may be more than 0.7 GPa and 1.2 GPa or less.

The hardness HLa measured from the optical interference layer side of the cured laminated film reflects the hardness of the multilayer of the hard coat layer and the optical interference layer in the laminated member. Thus, when the hardness HLa is more than 0.5 GPa, the hard coat performance of the laminated member is easily improved.

The hardness HLa and the hardness HLb are preferably measured in a range of up to 300 nm from the surface of the optical interference layer, particularly in a range of 50 nm or more and 100 nm or less from the surface layer of the optical interference layer. The hardness HLa and the hardness HLb are, for example, maximum values of hardness calculated from values measured by a nanoindentation method within a range of 50 nm or more and 100 nm or less from the surface layer of the optical interference layer.

(3) Lamination Step

A surface of the uncured hard coat layer opposite from the first support substrate and a surface of the uncured optical interference layer opposite from the second support substrate are bonded to each other. Thanks to this, a laminated film is obtained.

The hard coat layer and the optical interference layer are both dry. Thus, although each layer is uncured, movement of nonvolatile components between layers is suppressed, so that occurrence of a mixed phase is suppressed.

When the laminated film is manufactured by a roll-to-roll method, one or both of the first support substrate with the uncured hard coat layer and the second support substrate with the uncured optical interference layer are usually wound into a roll form. For example, when the second support substrate with the uncured optical interference layer is wound, the first support substrate that has undergone the step of forming an uncured hard coat layer is carried as it is into a laminator. At this time, the wound second support substrate is also carried into the laminator while being unwound. Similarly, when the first support substrate with the uncured hard coat layer is wound, the second support substrate that has undergone the step of forming an uncured optical interference layer is carried as it is into the laminator. Then, the wound first support substrate is carried into the laminator while being unwound.

The bonding is preferably performed while applying pressure. The pressure may be, for example, 0.1 N/cm or more and 50 N/cm or less. The pressure is preferably 0.5 N/cm or more. The pressure is preferably 30 N/cm or less.

The temperature of each layer at the time of bonding is not particularly limited. According to the present embodiment, both can be bonded at a low temperature. Thus, the formation of a mixed phase is more easily suppressed. The temperature of each layer at the time of bonding may be 0° C. or more and 40° C. or less. The temperature of each layer at the time of bonding is preferably 10° C. or more, and more preferably 15° C. or more. The temperature of each layer at the time of bonding is preferably 35° C. or less, and more preferably 30° C. or less.

Meanwhile, the laminated film may be heated after the lamination step. By heating after lamination, adhesion between the uncured hard coat layer and the uncured optical interference layer is further improved.

A plurality of uncured optical interference layers may be bonded. In this case, the laminated film is manufactured by the following steps.

The second support substrate is peeled off from the laminate including the first support substrate, the uncured hard coat layer, the uncured optical interference layer (a first optical interference layer), and the second support substrate in this order obtained by the lamination step, and thus, the uncured first optical interference layer is exposed.

Separately, another uncured optical interference layer (a second optical interference layer) is formed on a new support substrate.

Then, the uncured second optical interference layer supported by the new support substrate is bonded to the exposed uncured first optical interference layer.

These steps may be repeated as necessary.

Thanks to this, a laminated film including the first support substrate, the uncured hard coat layer, the uncured second optical interference layer (e.g., a high refractive index layer), at least the uncured first optical interference layer (e.g., a low refractive index layer), and the new support substrate in this order is obtained. The support substrate supporting the uncured optical interference layer to be bonded last may or may not be peeled.

After the lamination step, part of each uncured layer may be cured by irradiation with active energy rays. Thanks to this, a semi-cured laminated film is obtained. The integral light quantity of the active energy ray is, for example, 1 mJ/cm$^2$ or more and less than 100 mJ/cm$^2$.

(Laminated Film)

The laminated film obtained by the above manufacturing method comprises a first support substrate, an uncured hard coat layer formed on at least one surface of the first support substrate, and an uncured optical interference layer formed on the uncured hard coat layer. The uncured optical interference layer may be a laminate of a plurality of layers. The laminated film is of an after-cure type.

The hard coat layer and the optical interference layer are uncured but dry. The thickness of the first support substrate is 50 µm or more and 600 µm or less. Thus, the laminated film has high rigidity and is superior in handleability.

Since the hard coat layer and the optical interference layer are both uncured, the unevenness of the surface of each layer can be leveled by heat treatment or the like. That is, a laminated film having high smoothness can be obtained.

Curing of the uncured hard coat layer and the uncured optical interference layer hardly proceeds by heat treatment. Therefore, the uncured hard coat layer and the uncured optical interference layer can be subjected to heat treatment before the active energy ray irradiation step without affecting the adhesion between the layers and the stretch ratio of the laminated film. By the heat treatment, the smoothness of each layer can be improved. In addition, the laminated film may be subjected to preform.

The molecular weight distribution of the active energy ray-curable resin component contained in the uncured hard coat layer and the uncured optical interference layer does not change much before and after the heat treatment. The fact that the molecular weight distribution does not change much means that the peak of the weight average molecular weight, and when there are a plurality of molecular weight peaks, the shift amount in the height direction and the shift amount in the lateral direction of each molecular weight peak all fall within the range of 5%.

The heat treatment is performed under conditions that do not affect the performance of each layer. The conditions for the heat treatment may be appropriately set according to the composition of each layer. The temperature of the heat treatment may be 50° C. or more, 60° C. or more, or 90° C. or more. The temperature of the heat treatment may be 200° C. or less, or may be 190° C. or less. The time of the heat treatment may be 30 seconds or more and 10 minutes or less.

(Luminous Reflectance)

The luminous reflectance of the laminated film including regular reflected light measured from the uncured optical interference layer side is preferably 0.1% or more and 4.0% or less, or 6.0% or more and 10.0% or less. The luminous reflectance of the laminated film is measured in a state where the second support substrate is peeled off.

The fact that the luminous reflectance is within these ranges indicates that mixing of phases between the uncured hard coat layer and the uncured optical interference layer is suppressed and a clear interface is formed between both layers.

Displays are used in a variety of locations and environments. For example, displays may be used at a place that is easily affected by external light, or may be used at a place that is not easily affected by external light. In addition, a protective material of a display may be required to have high designability such as a metallic tone. Thus, the protective material for a display is required to have a high degree of freedom in design.

By the manufacturing method according to the present embodiment, an optical interference layer having desired thickness and smoothness can be formed with high accuracy. Therefore, the luminous reflectance can be easily designed within the above numerical range according to the purpose and application.

For example, by setting the luminous reflectance to 0.1% or more and 4.0% or less, a laminated film and a laminated member each having high antireflection properties can be obtained. In this case, the optical interference layer may be one low refractive index layer.

The luminous reflectance may be 0.5% or more, 1.0% or more, 1.5% or more, or 2.0% or more. The luminous reflectance may be 3.5% or less.

By setting the luminous reflectance to 6.0% or more and 10.0% or less, it is possible to obtain a laminated film and a laminated member each having high designability with a metal tone. In this case, the optical interference layer may have a high refractive index layer.

The luminous reflectance may be 6.0% or more, or 7.0% or more. The luminous reflectance may be 9.9% or less.

The laminated member obtained by curing the laminated film also has a superior antireflection property or a metal tone design. For example, a laminated member obtained by curing a laminated film having a luminous reflectance of 0.1% or more and 4.0% or less has less glare due to external light, and the laminated member has good display characteristics and good visibility.

The luminous reflectance of the laminated member may also be 0.1% or more and 4.0% or less, or 6.0% or more and 10.0% or less.

The luminous reflectance is obtained by measuring all reflected light including regular reflected light. Specifically, the luminous reflectance is measured by a so-called SCI (Specular Component Include) method. Since this method is hardly affected by the surface condition of the object to be measured, the luminous reflectance of the uncured layer can be measured. The luminous reflectance is calculated by averaging values measured five times while changing the measurement position.

Specifically, the luminous reflectance of the laminated film can be measured by the following method.

A black paint (for example, product name: CZ-805 BLACK (manufactured by NIKKO BICS Co., Ltd.) is applied to a surface of the first support substrate opposite from the uncured hard coat layer with a bar coater such that a dry film thickness is 3 µm or more and 6 µm or less. The evaluation sample M is then left to dry for 5 hours in a room temperature environment.

From the optical interference layer side of the obtained evaluation sample M, the luminous reflectance by the SCI method in a wavelength region of 380 nm or more and 780 nm or less is measured using a spectrophotometer (e.g., SD7000 manufactured by Nippon Denshoku Industries Co., Ltd.). The luminous reflectance of the laminated film according to the present embodiment is 0.1% or more and 4.0% or less, or 6.0% or more and 10.0% or less in a wavelength region of 380 nm or more and 780 nm or less.

The luminous reflectance of the laminated member can be measured as follows.

The evaluation sample M prepared as described above is irradiated with an active energy ray having an integral light quantity of 500 mJ/cm$^2$ to form an evaluation sample N. The luminous reflectance is measured in the same manner as described above from the optical interference layer side of the obtained evaluation sample N. Before irradiation with an active energy ray, the laminated film may be heat-treated at 80° C. for 1 hour.

(Stretch Ratio)

The stretch ratio of the laminated film at 160° C. is 50% or more. In this case, the laminated film is sufficiently stretched at a molding temperature of 150° C. or more and 190° C. or less. Thus, the laminated film can be shaped into a complicated three-dimensional shape without generating cracks. In particular, damage to the laminated film is easily suppressed in the preform step. The laminated film is molded by, for example, preform, insert molding or the like according to the required physical properties, shape, etc.

The stretch ratio of the laminated film at 160° C. is preferably 60% or more, and more preferably 70% or more. The stretch ratio of the laminated film at 160° C. may be less than 400%, less than 350%, or less than 300%. The stretch ratio of the laminated film is measured with the second support substrate peeled off.

In particular, when the laminated film is stretched at a stretch ratio of up to 250% under the condition of 100° C. or more and 200° C. or less, it is desirable that cracks of 1 μm or more in any one of the length, the width, and the depth, rupture, changes in appearance, etc. are not visually recognized.

The stretch ratio can be measured, for example, as follows.

A tensile tester having a distance between chucks of 150 mm and a test sample cut into a length of 200 mm×a width of 10 mm are prepared. Under a 160° C. atmosphere and under the conditions of a tensile force of 5.0 Kgf and a tensile speed of 300 mm/min, the long side of the test sample is stretched by 50%. The stretched test sample is observed with a microscope at a magnification of 1000 times or more, and the presence of cracks larger than a length of 100 μm and a width of 1 μm is checked.

When no cracks defined above are not generated, a new sample is cut out, and then the long side is stretched up to 60%. Then, the presence of cracks is checked by the same procedure. This procedure is repeated while increasing the stretch ratio by 10%, and the stretch ratio when a crack having the above size is first observed is taken as the stretch ratio of the laminated film. The test may be performed in the same manner as described above with the initial stretch ratio set to 250%.

(Abrasion Resistance)

The laminated member is desirably superior in abrasion resistance. For example, the laminated film is irradiated with an active energy ray at an integral light quantity of 500 mJ/cm$^2$ to obtain a laminated member. Then, the surface of the optical interference layer is rubbed 5000 times with a vertical load of 4.9 N. It is preferable that no scratch is visually recognized on the laminated member after the abrasion test. The fact that no scratch is visually recognized means that deterioration in visibility due to change in appearance is suppressed. Such a laminated member exhibits good visibility even when used for a long period of time.

The abrasion test is performed using a known method under the above conditions. In the abrasion test, a friction element to which a cotton cloth is fixed is usually used. This friction element applies a vertical load of 4.9 N to the sample.

Before irradiation with an active energy ray, the laminated film may be heated in an atmosphere of 150° C. or more and 190° C. or less for 30 seconds to 60 seconds. Thanks to this, the surface of the laminated film is leveled, and the abrasion resistance is more easily improved.

"No scratch is visually recognized" means that no scratch can be visually observed. The "scratch" is, for example, roughness of the surface. As long as no scratches are visually observed, very slight scratches may be observed when the sample after the abrasion test is observed using a microscope at a magnification of 100 times.

Hereafter, the constituent members of the laminated film will be further described.

[First Support Substrate]

The first support substrate is one of the members constituting the laminated member. The first support substrate is desirably transparent. Thanks to this, when a later-described decorative layer is provided on the laminated member, designability is further enhanced. To be transparent specifically means that the total light transmittance is 80% or more. The total light transmittance of the first support substrate is 80% or more, and preferably 90% or more. The total light transmittance can be measured by a method in accordance with JIS K 7361-1. The first support substrate may be either colorless or colored. A transparent support substrate known in the art is used without particular limitation.

The first support substrate is appropriately selected according to the application. Examples of the first support substrate include polycarbonate (PC)-based films; polyester-based films such as polyethylene terephthalate and polyethylene naphthalate; cellulose-based films such as diacetylcellulose and triacetylcellulose; acrylic films such as polymethyl methacrylate (PMMA); styrene-based films such as polystyrene and acrylonitrile-styrene copolymers; olefin-based films such as polyvinyl chloride, polyethylene, polypropylene, polyolefin having a cyclic or norbornene structure, and ethylene-propylene copolymers; and amide-based films such as nylon and aromatic polyamide. Further, the first support substrate may be a film comprising a resin such as polyimide, polysulfone, polyether sulfone, polyether ether ketone, polyphenylene sulfide, polyvinyl alcohol, polyvinylidene chloride, polyvinyl butyral, polyallylate, polyoxymethylene, and epoxy resin, or may be a film comprising a blend of those polymers.

The first support substrate may be a laminate of a plurality of films. For example, the first support substrate may be a laminate made up of a film made of an acrylic resin and a film made of a polycarbonate-based resin.

The first support substrate may have either optical anisotropy or isotropy. The magnitude of birefringence of the first support substrate having optical anisotropy is not particularly limited. The phase difference of the first support substrate having anisotropy may be ¼ of the wavelength (λ/4) or may be ½ of the wavelength (λ/2).

[Uncured Hard Coat Layer]

The uncured hard coat layer contains an active energy ray-curable composition HC. The composition HC is cured by active energy rays.

The active energy ray is an ionizing radiation such as an ultraviolet ray, an electron beam, an α ray, a β ray, or a γ ray. The composition HC is preferably especially of an ultraviolet-curable type.

The composition HC contains an active energy ray-curable resin component. The active energy ray-curable resin component has a polymerizable group having an unreacted unsaturated bond (a polymerizable unsaturated group; typically a (meth)acryloyl group). The unreacted polymerizable unsaturated group has, for example, a double bond represented by C═C. When irradiation with an active energy ray is performed, an unreacted polymerizable unsaturated group reacts, so that the double bond disappears. The disappearance of the double bond can be confirmed by a known method such as FT-IR.

When the uncured hard coat layer is irradiated with an active energy ray having an integral light quantity of 500 mJ/cm$^2$, 10% to 100% of the unreacted polymerizable unsaturated groups contained in the uncured hard coat layer disappear.

The disappearance ratio of the unreacted polymerizable unsaturated groups when the uncured hard coat layer is irradiated with an active energy ray having an integral light quantity of 500 mJ/cm$^2$ may be 15% or more and 90% or less, 20% or more and 80% or less, 30% or more and 70% or less, or 30% or more and 60% or less.

The disappearance ratio of the unreacted polymerizable unsaturated groups when the uncured hard coat layer is irradiated with an active energy ray having an integral light quantity of 30 mJ/cm$^2$ may be 10% or more and 50% or less.

The disappearance ratio of the unreacted polymerizable unsaturated groups when the uncured hard coat layer is irradiated with an active energy ray having an integral light quantity of 5 mJ/cm$^2$ may be 10% or more and 30% or less, or may be 10% or more and 50% or less.

As the disappearance ratio of the unreacted polymerizable groups increases, the crosslinking density increases. Accordingly, the hardness of the hard coat layer tends to be high and the stretch ratio tends to be low. By adjusting the integral light quantity of the active energy ray, the hardness and/or the stretch ratio of the hard coat layer can be controlled.

For example, a preform is applied to a laminated film that has not been irradiated with active energy rays. Thereafter, prior to a main molding step, the laminated film is irradiated with an active energy ray to such an extent that the laminated film is not completely cured, so that the stretch ratio of the laminated film is adjusted to 1% or more and 15% or less. Thanks to this, the laminated film can be slightly stretched to such an extent that the shape applied in the preform step can be maintained. Thanks to this, even when there is a slight dimensional difference between the mold to be used in the preform step and the mold to be used in the main molding step, the laminated film can be shaped while suppressing the generation of cracks in the main molding step. In addition, since the hardness of the hard coat layer is increased by irradiation with an active energy ray, adhesion of the hard coat layer to the mold is suppressed in the main molding step. Examples of the main molding include injection molding such as insert molding.

Specifically, after the preform step, the laminated film is irradiated with an active energy ray having an integral light quantity of 1 mJ/cm$^2$ or more and 100 mJ/cm$^2$ or less (semi-curing). Thanks to this, the laminated film is easily shaped along the mold used in the present molding while suppressing the occurrence of cracks. Thereafter, main molding is performed. Subsequently, irradiation with an active energy ray having an integral light quantity of 100 mJ/cm$^2$ or more is performed (main curing). Specifically, after the preform step, the laminated film is irradiated with an active energy ray having an integral light quantity of 1 mJ/cm$^2$ or more and 100 mJ/cm$^2$ or less (semi-curing). Thanks to this, the laminated film is easily released from the mold used in the main molding. Thereafter, main molding is performed. Subsequently, the laminated film is irradiated with an active energy ray having an integral light quantity of 100 mJ/cm$^2$ or more.

The disappearance ratio of the unreacted polymerizable unsaturated groups does not change much before and after heating. In other words, by the heat treatment, the curing of the composition HC hardly proceeds. Thus, before semi-curing or main curing, the uncured hard coat layer can be subjected to heat treatment without affecting the adhesion of the hard coat layer or the stretch ratio of the laminated film. The smoothness of the hard coat layer can be improved by the heat treatment. Accordingly, the smoothness of the obtained laminated member is also improved.

The molecular weight distribution of the active energy ray-curable resin component does not change much before and after the heat treatment. The fact that the molecular weight distribution does not change much means that the peak of the weight average molecular weight, and when there are a plurality of molecular weight peaks, the shift amount in the height direction and the shift amount in the lateral direction of each molecular weight peak all fall within the range of 5%.

The heat treatment is performed under conditions that do not affect the performance of the hard coat layer. The conditions for the heat treatment may be appropriately set according to the composition of the composition HC. The temperature of the heat treatment may be 90° C. or more and 200° C. or less, 100° C. or more and 200° C. or less, or 110° C. or more and 200° C. or less. The time of the heat treatment may be 10 seconds or more and 10 minutes or less.

The heat treatment may be performed by utilizing heat applied in the preform step. By performing the preform at about 150° C. or more and 190° C. or less, the uncured hard coat layer can be sufficiently leveled while performing the preform.

(Composition HC)

The hard coat layer is laminated in an uncured state with the uncured optical interference layer. Furthermore, the laminated film is subjected to various processing in an uncured state. Therefore, the uncured hard coat layer is required to have low tack and be less likely to be polluted, to suppress air entrapment, damage, and change in outward appearance during processing, to suppress curling due to a difference in thermal shrinkage from other layers, etc.

Examples of the damage during processing include recesses and squeegee marks formed in the printing process. Examples of the change in outward appearance during processing include foaming and cracking in the preform step.

These requirements can be achieved by controlling the hardness, rigidity, smoothness, tackiness, etc. of the uncured hard coat layer. The physical properties of the uncured hard coat layer can be adjusted by the thickness thereof, the composition of the composition HC, etc.

<Resin Component>

The composition HC contains an active energy ray-curable resin component. The active energy ray-curable resin component includes a monomer, oligomer, or polymer that can be crosslinked and cured by active energy rays.

Specific examples of the active energy ray-curable resin component include monomers, oligomers, or polymers having at least one polymerizable unsaturated group (hereinafter may be referred to as reactive resin). More specific examples of the active energy ray-curable resin component include (meth)acrylate compounds such as a (meth)acrylate monomer, a (meth)acrylate oligomer, and a (meth)acrylate polymer; urethane (meth)acrylate compounds such as a urethane (meth)acrylate monomer, a urethane (meth)acrylate oligomer, and a urethane (meth)acrylate polymer; and silicon (meth)acrylate compounds such as a silicon (meth)acrylate monomer, a silicon (meth)acrylate oligomer, and a silicon (meth)acrylate polymer. These are used singly or two or more of them are used in combination. "(Meth)acrylate" means acrylate and/or methacrylate.

Among them, a reactive resin is preferable. The crosslinking density of the cured hard coat layer is easily increased by the reactive resin. Accordingly; superior hard coat performance is exhibited.

The weight-average molecular weight (Mw) of the reactive resin is preferably 5000 or more and 100000 or less, more preferably 6000 or more and 95000 or less, and even more preferably 9000 or more and 90000 or less. The glass transition temperature (Tg) of the reactive resin is, for example, preferably 40° C. or more and 120° C. or less, and more preferably 40° C. or more and 110° C. or less. This makes it easier to further improve the smoothness and rigidity of the uncured hard coat layer. In particular, a reactive acrylic resin is preferable.

The weight-average molecular weight (Mw) can be calculated based on the molecular weight of standard polystyrene from a chromatogram measured by gel permeation chromatography.

The composition HC may comprise a non-reactive resin. The composition HC may comprise a non-reactive resin together with a reactive resin. The composition HC may comprise two or more reactive resins and two or more non-reactive resins.

The non-reactive resin is a resin that does not react or hardly exhibits reactivity even when irradiated with an active energy ray (typically, ultraviolet rays). Examples of the non-reactive resin include urethane resin, acrylic resin, polyester resin, and epoxy resin. The weight-average molecular weight (Mw) of the non-reactive resin is preferably 5000 or more and 100000 or less, and more preferably 6000 or more and 95000 or less.

When a plurality of reactive resins and/or non-reactive resins are contained, it is just required that the Mw of one resin is 5000 or more and 100000 or less. The Mw of the other resins is not particularly limited. The Mw of the other resins may be, for example, 10000 or more and 80000 or less. When resins having various weight-average molecular weights are used in combination, the uncured hard coat layer tends to have high smoothness, and it is easy to adjust the hardness of the uncured hard coat layer to a desired range.

The composition HC preferably contains at least one of a non-reactive acrylic resin and a reactive acrylic resin. Although it should not be construed as being limited to a particular theory, this can increase the smoothness and rigidity of the uncured hard coat layer.

The total content of the reactive acrylic resin and/or the non-reactive acrylic resin is preferably more than 20 parts by mass and 60 parts by mass or less, more preferably 30 parts by mass or more and 60 parts by mass or less, and particularly preferably 35 parts by mass or more and 60 parts by mass or less, per 100 parts by mass of the solid content of the composition HC.

The solid content of the composition HC is the above-described active energy ray-curable resin component, non-reactive resin, photopolymerization initiator, inorganic oxide fine particles, etc. The same applies to the solid content of the composition for forming an optical interference layer.

The composition HC preferably comprises at least one selected from among a polyfunctional (meth)acrylate compound, a polyfunctional urethane (meth)acrylate compound, and a polyfunctional silicon (meth)acrylate compound. Thanks to this, the uncured hard coat layer exhibits a high viscosity at normal temperature, and the viscosity thereof is decreased by heating. Thus, the uncured hard coat layer exhibits good adhesion to the uncured optical interference layer, and is easily shaped into a complicated shape. Furthermore, since the cured hard coat layer has a high crosslinking density, the hard coat performance is further improved.

Among them, the composition HC preferably comprises a reactive acrylic resin and/or a non-reactive acrylic resin, and a polyfunctional urethane (meth)acrylate monomer and/or oligomer. This makes it easier to further improve the shapeability of the uncured hard coat layer and the hard coat performance of a cured hard coat layer. Furthermore, the adhesion between the uncured hard coat layer and the uncured optical interference layer is further improved. Therefore, air entrapment is suppressed when the two layers are bonded together.

In particular, the composition HC preferably comprises a reactive acrylic resin and/or a non-reactive acrylic resin having an Mw of 5000 or more and 100000 or less and a polyfunctional urethane (meth)acrylate monomer and/or oligomer having an acrylate equivalent of 100 g/eq. or more and 200 g/eq. or less. Thanks to this, the low tackiness of the uncured hard coat layer is further improved.

The content of the polyfunctional urethane (meth)acrylate monomer and/or oligomer is preferably 5 parts by mass or more and 70 mass or less, more preferably 10 parts by mass or more and 70 parts by mass or less, and particularly preferably 13 parts by mass or more and 68 parts by mass or less, per 100 parts by mass of the solid content of the composition HC.

The acrylate equivalent of the polyfunctional urethane (meth)acrylate monomer and/or oligomer may be 110 g/eq. or more and 180 g/eq. or less, and may be 115 g/eq. or more and 160 g/eq. or less.

The composition HC may comprise a reactive acrylic resin and/or a non-reactive acrylic resin, and at least one selected from the group consisting of a polyfunctional silicon (meth)acrylate monomer and/or oligomer, and inorganic oxide fine particles.

In particular, the composition HC preferably comprises a reactive acrylic resin and/or a non-reactive acrylic resin, a polyfunctional silicon (meth)acrylate monomer and/or oligomer, and inorganic oxide fine particles.

Although it should not be construed as being limited to a particular theory, the polyfunctional silicon (meth)acrylate monomer and/or oligomer makes it possible to reduce the surface tension of the uncured hard coat layer and improve the leveling property. The inorganic oxide fine particles suppress volume shrinkage of the uncured hard coat layer and easily increase rigidity. Thus, change in appearance during the process of manufacturing the uncured hard coat layer is easily suppressed. Furthermore, change in outward appearance of the cured hard coat layer and occurrence of curling are also suppressed. In addition, the tackiness of the cured hard coat layer is reduced, and the abrasion resistance tends to be increased.

The Mw of the polyfunctional silicon (meth)acrylate monomer and/or oligomer is preferably 700 or more and 100000 or less, more preferably 800 or more and 90000 or less, and preferably 800 or more and 85000 or less.

The content of the polyfunctional silicon (meth)acrylate monomer and/or oligomer is preferably 0.1 parts by mass or more and 50 mass or less, more preferably 1 part by mass or more and 45 parts by mass or less, and particularly preferably 1.5 parts by mass or more and 40 parts by mass or less, per 100 parts by mass of the solid content of the composition HC.

The content of the inorganic oxide fine particles is preferably 1 part by mass or more and 55 parts by mass or less, more preferably 10 parts by mass or more and 50 parts by mass or less, and particularly preferably 12 parts by mass or more and 40 parts by mass or less, per 100 parts by mass of the solid content of the composition HC.

The inorganic oxide fine particles are not particularly limited. Examples of the inorganic oxide fine particles include silica ($SiO_2$) particles, alumina particles, titania particles, tin oxide particles, antimony-doped tin oxide (ATO) particles, zinc oxide particles, and zirconia oxide particles. The surface of the inorganic oxide fine particles may be modified with a functional group containing an unsaturated double bond. The functional group is desirably a (meth)acryloyl group. Among them, silica particles and alumina particles are preferable from the viewpoint of cost and coating material stability, and in particular, silica particles and alumina particles whose surfaces are modified with a functional group are preferable. The form of the inorganic oxide fine particles may be sol.

The primary particle diameter of the inorganic oxide fine particles is not particularly limited. From the viewpoint of transparency and coating material stability, the primary particle diameter of the inorganic oxide fine particles is preferably 5 nm or more and 100 nm or less. The primary particle diameter of the inorganic oxide fine particles is a value measured using image processing software from an image of a cross section taken with an electron microscope. The average particle diameter of other granular materials is also determined by the same method.

(Silica Particles)

Examples of commercially available silica particles (colloidal silica) are shown below.

Manufactured by Nissan Chemical Corporation: IPA-ST, MEK-S TM, IBK-S T, PGMST, XBA-S T, MEK-AC-2101, MEK-AC-2202, and MEKAC-4101 M I B K-SD Manufactured by FUSO CHEMICAL CO., LTD.: PL-1-IPA, PL-1-TOL, PL-2-IPA, PL-2-MEK, and PL-3-TOL Manufactured by JGC Catalysts and Chemicals Ltd.: OSCAL series and ELECOM series Manufactured by BYK Japan KK: NANOBYK-3605

(Alumina Particles)

Examples of commercially available alumina particles are shown below.

Manufactured by Sumitomo Osaka Cement Co., Ltd.: AS-15 0 I and AS-150 T

Manufactured by BYK Japan KK: NANOBYK-3601, NANOBYK-3602, and NANOBYK-3610

(Zirconia Oxide Particles)

Examples of commercially available zirconia oxide particles are shown below.

Manufactured by Sakai Chemical Industry Co., Ltd.: SZR-K and SZR-KM

Manufactured by CIK NanoTek Corporation: ZRANB15WT %-P02, ZRMIBK15WT %-P01, and ZRMIBK15WT %-F85

Manufactured by Solar: NANON5ZR-010 and NANON5ZR-020

Examples of the (meth)acrylate monomer or oligomer include methyl (meth)acrylate, ethyl (meth)acrylate, n-butyl (meth)acrylate, isobutyl (meth)acrylate, 2-ethylhexyl (meth) acrylate, acrylic acid, methacrylic acid, isostearyl (meth) acrylate, ethoxylated o-phenylphenol acrylate, methoxypolyethylene glycol acrylate, methoxypolyethylene glycol acrylate, phenoxypolyethylene glycol acrylate, 2-acryloyloxyethyl succinate, 2-hydroxyethyl (meth)acrylate, 2-hydroxypropyl (meth)acrylate, ethylene glycol mono(meth) acrylate, propylene glycol mono(meth)acrylate, 2-hydroxy-3-methoxypropyl (meth)acrylate, N-methylol(meth) acrylamide, and N-hydroxy(meth)acrylamide.

(Polyfunctional (meth)acrylate monomer or oligomer) Examples of commercially available polyfunctional (meth) acrylate monomer or oligomer are shown below.

DPHA (manufactured by Daicel-Allnex Ltd.), PETRA (manufactured by Daicel-Allnex Ltd., pentaerythritol triacrylate), PETIA (manufactured by Daicel-Allnex Ltd.), ARONIX M-403 (manufactured by Toagosei Co., Ltd., dipentaerythritol penta and hexaacrylate), ARONIX M-402 (manufactured by Toagosei Co., Ltd., dipentaerythritol penta and hexaacrylate), ARONIX M-400 (manufactured by Toagosei Co., Ltd., dipentaerythritol penta and hexaacrylate), SR-399 (manufactured by Arkema, dipentaerythritol hydroxypentaacrylate), KAYARAD DPHA (manufactured by Nippon Kayaku Co., Ltd.), KAYARAD DPHA-2C (manufactured by Nippon Kayaku Co., Ltd.), ARONIX M-404, M-405, M-406, M-450, M-305, M-309, M-310, M-315, M-320, TO-1200, TO-1231, TO-595, TO-756 (manufactured by Toagosei Co., Ltd.), KAYARD D-310, D-330, DPHA, DPHA-2C (manufactured by Nippon Kayaku Co., Ltd.), and NIKALAC MX-302 (manufactured by Sanwa Chemical Co., Ltd.).

Examples of the (meth)acrylate polymer include at least one polymer of the (meth)acrylate monomer and oligomer described above.

(Polyfunctional Urethane (Meth)Acrylate Monomer or Oligomer)

Examples of commercially available polyfunctional urethane (meth)acrylate monomer or oligomer are shown below.

Bifunctional urethane (meth)acrylates ("UX-2201", "UX-8101", and "UX-6101" manufactured by Nippon Kayaku Co., Ltd., "UF-8001" and "UF-8003" manufactured by Kyoeisha Chemical Co., Ltd., "Ebecryl 244", "Ebecryl 284", "Ebecryl 2002", "Ebecryl 4835", "Ebecryl 4883", "Ebecryl 8807", and "Ebecryl 6700" manufactured by Daicel-Allnex Ltd.); trifunctional urethane (meth)acrylates ("Ebecryl 254", "Ebecryl 264", and "Ebecryl 265" manufactured by Daicel-Allnex Ltd.); tetrafunctional urethane (meth)acrylates ("Ebecryl8210" manufactured by Daicel-Allnex Ltd.); hexafunctional urethane (meth)acrylates ("Ebecryl 1290k", "Ebecryl 5129", "Ebecryl 220", "KRM-8200", and "Ebecryl 1290N" manufactured by Daicel-Allnex Ltd.); nonafunctional urethane (meth)acrylates ("KRM-7804" manufactured by Daicel-Allnex Ltd.); decafunctional urethane (meth)acrylates ("KRM-8452" and "KRM-8509" manufactured by Daicel-Allnex Co., Ltd.); and pentadecafunctional urethane (meth)acrylates ("KRM-8655" manufactured by Daicel-Allnex Ltd.).

The urethane (meth)acrylate monomer or oligomer can be prepared, for example, by reacting a polycarbonate diol, a (meth)acrylate compound containing a hydroxyl group and an unsaturated double bond group in the molecule thereof, and a polyisocyanate.

Examples of the urethane (meth)acrylate polymer include a polymer of at least one of the above-mentioned urethane (meth)acrylate monomers and oligomers.

The silicon (meth)acrylate monomer or oligomer is a (meth)acrylate monomer or oligomer having a siloxane linkage. A functional group containing a fluorine atom may be bonded to the silicon atom.

(Polyfunctional silicon (meth)acrylate monomers and oligomers) Examples of commercially available polyfunctional silicon (meth)acrylate monomer or oligomer are shown below.

Compound Having Methacryloyl Group and Acryloyl Group

Manufactured by BYK: BYK-UV3500 and BYK-UV3570

Manufactured by Shin-Etsu Chemical Co., Ltd.: Shin-Etsu Silicone X-22-164, Shin-Etsu Silicone X-22-164AS, Shin-Etsu Silicone X-22-164A, Shin-Etsu Silicone X-22-164B, Shin-Etsu Silicone X-22-164C, Shin-Etsu Silicone X-22-164E, Shin-Etsu Silicone X-22-174DX, Shin-Etsu Silicone X-22-2426, Shin-Etsu Silicone X-22-2475, KER-4000-UV, KER-4700-UV, KER-4710-UV, and KER-4800-UV.

Manufactured by JNC: FM-0711, FM-0721, FM-0725, TM-0701, FM-7711, FM-7721, and FM-7725

Evonik Japan: TEGO (registered trademark) Rad 2010 and TEGO (registered trademark) Rad 2011

Polyfunctional Silicon (Meth)Acrylate Monomer or Oligomer Having a Fluorine Atom Manufactured by Mitsubishi Chemical Corporation: Shikoh UV-AF305

Manufactured by T&K TOKA: ZX-212 and ZX-214-A

Manufactured by Shin-Etsu Chemical Co., Ltd.: KY-1203

The composition HC may comprise a reactive acrylic resin and/or a non-reactive acrylic resin and at least one selected from the group consisting of a polyfunctional urethane acrylate monomer and/or oligomer, a polyfunctional silicon (meth)acrylate monomer or oligomer having a fluorine atom, and inorganic oxide fine particles.

<Photopolymerization Initiator>

The composition HC preferably comprises a photopolymerization initiator. Thanks to this, polymerization of the active energy ray-curable resin component easily proceeds.

Examples of the photopolymerization initiator include alkylphenone-based photopolymerization initiators, acylphosphine oxide-based photopolymerization initiators, titanocene-based photopolymerization initiators, and oxime ester-based polymerization initiators.

Examples of the alkylphenone-based photopolymerization initiators include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4-morpholinophenyl)butanone-1, and 2-(dimethylamino)-2-[(4-methylphenyl)methyl]-1-[4-(4-morpholinyl)phenyl]-1-butanone.

Examples of the acylphosphine oxide-based photopolymerization initiators include 2,4,6-trimethylbenzoyl-diphenyl-phosphine oxide and bis(2,4,6-trimethylbenzoyl)-phenylphosphine oxide.

Examples of the titanocene-based photopolymerization initiators include bis(η5-2,4-cyclopentadien-1-yl)-bis(2,6-difluoro-3-(1H-pyrrol-1-yl)-phenyl)titanium.

Examples of the oxime ester-based polymerization initiator include 1,2-octanedione, 1-[4-(phenylthio)-, 2-(0-benzoyloxime)], ethanone, 1-[9-ethyl-6-(2-methylbenzoyl)-9H-carbazol-3-yl]-, 1-(0-acetyloxime), oxyphenylacetic acid, 2-[2-oxo-2-phenylacetoxyethoxy]ethyl ester, and 2-(2-hydroxyethoxy)ethyl ester. These photopolymerization initiators are used singly or two or more of them are used in combination.

Among them, preferred is at least one selected from the group consisting of 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1, and 2,2-dimethoxy-1,2-diphenylethan-1-one.

The amount of the photopolymerization initiator is preferably 0.01 parts by mass or more and 10 parts by mass or less, and more preferably 1 part by mass or more and 10 parts by mass or less, per 100 parts by mass of the solid content of the composition HC.

<Solvent>

The composition HC may comprise a solvent. The solvent is not particularly limited, and is appropriately selected in consideration of the components contained in the composition, the type of the first support substrate, the application method, etc.

Examples of the solvent include aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether (PGM), anisole, and phenetole; ester solvents such as ethyl acetate, butyl acetate, isopropyl acetate, and ethylene glycol diacetate; amide solvents such as dimethylformamide, diethylformamide, and N-methylpyrrolidone; cellosolve solvents such as methyl cellosolve, ethyl cellosolve, and butyl cellosolve; alcohol solvents such as methanol, ethanol, propanol, isopropyl alcohol, butanol, isobutyl alcohol, and diacetone alcohol (DAA); and halogen-containing solvents such as dichloromethane and chloroform. These solvents are used singly or two or more of them are used in combination. Among them, ester solvents, ether solvents, alcohol solvents, and ketone solvents are preferable.

<Others>

The composition HC may comprise various additives as necessary. Examples of the additives include antistatic agents, plasticizers, surfactants, antioxidants, ultraviolet absorbers, surface conditioners, leveling agents, and light stabilizers (e.g., hindered amine light stabilizer (HALS)).

[Second Support Substrate]

As the second support substrate, a protective film known in the art is used without particular limitation. The second support substrate may be either colorless or colored. The second support substrate may be transparent. The second support substrate may have an adhesive layer on the application surface.

The thickness of the second support substrate is not particularly limited. The thickness of the second support substrate may be 20 µm or more and 100 µm or less. Thanks to this, the effect of protecting the uncured optical interference layer is easily enhanced. The thickness of the second support substrate is preferably 25 µm or more, more preferably 30 µm or more, even more preferably 33 µm or more, and particularly preferably 35 µm or more. The thickness of the second support substrate is preferably 85 µm or less, more preferably 80 µm or less, and even more preferably 65 µm or less. The thickness of the second support substrate is a value that does not include the thickness of the adhesive layer.

The second support substrate is made of, for example, resin. Examples of the resin film include polyolefin films such as polyethylene films and polypropylene films (including an unoriented polypropylene film (CPP film) and a biaxially oriented polypropylene film (OPP film)), modified polyolefin films obtained by modifying these polyolefins to add further functions, polyester films such as polyethylene terephthalate, polycarbonate and polylactic acid, polystyrene resin films such as polystyrene films, AS resin films and ABS resin films, nylon films, polyamide films, polyvinyl chloride films and polyvinylidene chloride films, and polymethylpentene films.

Additives such as an antistatic agent and an ultraviolet inhibitor may be added to the resin film as necessary. The surface of the resin film may have been subjected to corona treatment or low-temperature plasma treatment.

Among them, at least one selected from among a polyethylene film, a polystyrene film, a modified polyolefin film, a polymethylpentene film, an OPP film, and a CPP film is preferable.

In particular, at least one selected from among a polyethylene film, a polystyrene film, a modified polyolefin film, a polymethylpentene film, an OPP film, and a CPP film each having a thickness of 30 μm or more and 100 μm or less is preferable.

[Uncured Optical Interference Layer]

The uncured optical interference layer comprises an active energy ray-curable composition R. The composition R is cured by active energy rays. The composition R is preferably cured by the same type of active energy ray as the composition HC.

The refractive index of the uncured optical interference layer is not particularly limited. When antireflection performance is required, the refractive index of the uncured optical interference layer is preferably 1.35 or more and 1.55 or less. When the uncured optical interference layer has such a low refractive index, good antireflection properties are easily exhibited. Hereinafter, any layer having the refractive index described above is referred to as a low refractive index layer. The refractive index of the low refractive index layer may be 1.38 or more and 1.55 or less, and may be 1.38 or more and 1.51 or less.

When a metallic tone design is required, the refractive index of the uncured optical interference layer is preferably more than 1.55 and 2.00 or less. When the uncured optical interference layer has such a high refractive index, a superior metallic tone design is easily obtained. Hereinafter, any layer having the refractive index described above is referred to as a high refractive index layer.

The uncured optical interference layer may further include an optical interference layer having a medium refractive index (a medium refractive index layer). The refractive index of the medium refractive index layer is not particularly limited as long as it is between the optical interference layer (low refractive index layer) and the high refractive index layer according to the present embodiment. The refractive index of the medium refractive index layer may be, for example, 1.55 or more and 1.70 or less.

The thickness of each of the optical interference layers may be 10 nm or more and 300 nm or less. The thickness of each of the optical interference layers is preferably 15 nm or more, more preferably 40 nm or more, and particularly preferably 60 nm or more. The thickness of each of the optical interference layers is preferably 200 nm or less, more preferably 180 nm or less, and particularly preferably 150 nm or less.

The composition R comprises an active energy ray-curable resin component. The active energy ray-curable resin component has a polymerizable group having an unreacted unsaturated bond (a polymerizable unsaturated group; typically a (meth)acryloyl group).

When the uncured optical interference layer is irradiated with an active energy ray having an integral light quantity of 500 mJ/cm$^2$, 10% to 100% of the unreacted polymerizable unsaturated groups contained in the uncured optical interference layer disappear.

The disappearance ratio of the unreacted polymerizable unsaturated groups when the uncured optical interference layer is irradiated with an active energy ray having an integral light quantity of 500 mJ/cm$^2$ may be 15% or more and 90% or less, or may be 20% or more and 80% or less, or may be 30% or more and 70% or less, or may be 30% or more and 60% or less.

The disappearance ratio of the unreacted polymerizable unsaturated groups when the uncured optical interference layer is irradiated with an active energy ray having an integral light quantity of 5 mJ/cm$^2$ may be 10% or more and 30% or less, or may be 10% or more and 50% or less.

The disappearance ratio of the unreacted polymerizable unsaturated groups when the uncured optical interference layer is irradiated with an active energy ray having an integral light quantity of 30 mJ/cm$^2$ may be 10% or more and 50% or less.

As the disappearance ratio of the unreacted polymerizable groups increases, the crosslinking density increases. Thus, the hardness of the optical interference layer is high, and the stretch ratio tends to be low. By adjusting the integral light quantity of the active energy ray, the hardness and/or the stretch ratio of the optical interference layer can be controlled.

Also in the uncured optical interference layer, the disappearance ratio of the unreacted polymerizable unsaturated groups does not change much before and after heating. In other words, by the heat treatment, the curing of the composition R hardly proceeds. Therefore, the uncured optical interference layer can be subjected to heat treatment before the active energy ray irradiation step without affecting the adhesion of the optical interference layer and the stretch ratio of the laminated film. By the heat treatment, the smoothness of the optical interference layer can be improved. Accordingly, the smoothness of the obtained laminated member is also improved.

The heat treatment is performed under conditions that do not affect the performance of the optical interference layer. The conditions for the heat treatment may be appropriately set according to the composition of the composition R. The temperature of the heat treatment may be 90° C. or more and 200° C. or less, 100° C. or more and 200° C. or less, or 110° C. or more and 200° C. or less. The time of the heat treatment may be 10 seconds or more and 10 minutes or less.

The heat treatment also may be performed by utilizing heat applied in the preform step. The uncured optical interference layer can be sufficiently leveled while being preformed.

(Composition R)

The optical interference layer is laminated in an uncured state with the uncured hard coat layer. Furthermore, as described above, the laminated film is subjected to various processing in an uncured state. So, the optical interference layer is required to have the same performance as that of the hard coat layer in addition to reflectivity. In particular, the optical interference layer is required to exhibit desired reflectivity, to have low tack and be less likely to be polluted, and to suppress damage and change in outward appearance during processing. Examples of the change in outward appearance during processing include streaks called zipping marks generated when the protective film is peeled off.

These requirements can be achieved by controlling the hardness, rigidity, smoothness, tackiness, etc. of the uncured optical interference layer. The physical properties of the uncured optical interference layer can be adjusted by the thickness thereof, the composition of the composition R, etc.

<Resin Component>

The composition R comprises an active energy ray-curable resin component. The active energy ray-curable resin component includes a monomer, oligomer, or polymer (reactive resin) that can be crosslinked and cured by active energy rays. Examples of the active energy ray-curable resin component contained in the composition R may be the same as those of the active energy ray-curable resin components contained in the composition HC.

Among them, a reactive resin is preferable. The weight-average molecular weight (Mw) of the reactive resin is preferably 5000 or more and 100000 or less, more preferably 6000 or more and 95000 or less, and even more preferably 9000 or more and 90000 or less. The glass transition temperature (Tg) of the reactive resin is, for example, preferably 40° C. or more and 120° C. or less, and more preferably 40° C. or more and 110° C. or less. This makes it easier to further improve the smoothness and rigidity of the uncured optical interference layer. In particular, a reactive acrylic resin is preferable.

The composition R may comprise a non-reactive resin. Examples of the non-reactive resin may be the same as those of the non-reactive resin contained in the composition HC. The weight-average molecular weight (Mw) of the non-reactive resin is preferably 5000 or more and 100000 or less, and more preferably 6000 or more and 95000 or less.

The composition R may comprise a non-reactive resin together with a reactive resin. The composition R may comprise two or more reactive resins and two or more non-reactive resins.

The total content of the reactive acrylic resin and/or the non-reactive acrylic resin is preferably more than 5 parts by mass and 40 parts by mass or less, more preferably 10 parts by mass or more and 30 parts by mass or less, and particularly preferably 15 parts by mass or more and 25 parts by mass or less, per 100 parts by mass of the solid content of the composition R.

When a plurality of reactive resins and/or non-reactive resins are contained, it is just required that the Mw of one resin is 5000 or more and 100000 or less. The Mw of the other resins is not particularly limited. The Mw of the other resins may be, for example, 10000 or more and 80000 or less. When resins having various weight-average molecular weights are used in combination, the uncured optical interference layer tends to have high smoothness, and it is easy to adjust the hardness of the uncured optical interference layer to a desired range.

Among them, the composition R preferably comprises a reactive acrylic resin and/or a non-reactive acrylic resin, and a polyfunctional urethane (meth)acrylate monomer and/or oligomer. Thanks to this, an uncured optical interference layer having low tackiness and being less likely to be contaminated is easily obtained. Furthermore, the adhesion between the uncured hard coat layer and the uncured optical interference layer is improved. Accordingly, air entrapment is suppressed. Examples of the polyfunctional urethane (meth)acrylate monomer and oligomer may be the same as those of the polyfunctional urethane (meth)acrylate monomer and oligomer contained in the composition HC.

In particular, the composition R preferably comprises a reactive acrylic resin and/or a non-reactive acrylic resin having an Mw of 5000 or more and 100000 or less and a polyfunctional urethane (meth)acrylate monomer and/or oligomer having an acrylate equivalent of 100 g/eq. or more and 200 g/eq. or less.

The content of the polyfunctional urethane (meth)acrylate monomer and/or oligomer is preferably 5 parts by mass or more and 70 mass or less, more preferably 10 parts by mass or more and 70 parts by mass or less, and particularly preferably 13 parts by mass or more and 68 parts by mass or less, per 100 parts by mass of the solid content of the composition R.

The acrylate equivalent of the polyfunctional urethane (meth)acrylate monomer and/or oligomer may be 110 g/eq. or more and 180 g/eq. or less, and may be 115 g/eq. or more and 160 g/eq. or less.

The composition R may comprise a reactive acrylic resin and/or a non-reactive acrylic resin, and at least one selected from the group consisting of a polyfunctional silicon (meth)acrylate monomer and/or oligomer, a fluororesin, and inorganic oxide fine particles.

Among them, the composition R preferably comprises a reactive acrylic resin and/or a non-reactive acrylic resin, a polyfunctional silicon (meth)acrylate monomer and/or oligomer, a fluororesin, and inorganic oxide fine particles.

Although it should not be construed as being limited to a particular theory, the polyfunctional silicon (meth)acrylate makes it possible to reduce the surface tension of the uncured optical interference layer, improve the leveling property, and reduce the tackiness. Since slipperiness is imparted to the uncured and cured optical interference layers by the fluororesin, abrasion resistance is easily improved. The inorganic oxide fine particles suppress volume shrinkage of the uncured optical interference layer and easily increase rigidity. Thus, change in outward appearance during the process of producing the uncured optical interference layer is easily suppressed. Furthermore, a change in appearance of the cured optical interference layer and occurrence of curling are also suppressed. In addition, the tackiness of the cured optical interference layer is reduced and the abrasion resistance is easily improved.

Examples of the polyfunctional silicon (meth)acrylate monomer and/or oligomer may be the same as those of the polyfunctional silicon (meth)acrylate monomer and/or oligomer contained in the composition HC. Examples of the inorganic oxide fine particles may be the same as those of the inorganic oxide fine particles contained in the composition HC.

The Mw of the polyfunctional silicon (meth)acrylate monomer and/or oligomer is preferably 700 or more and 100000 or less, more preferably 800 or more and 90000 or less, and preferably 800 or more and 85000 or less.

The content of the polyfunctional silicon (meth)acrylate monomer and/or oligomer is preferably 5 parts by mass or more and 50 mass or less, more preferably 10 parts by mass or more and 48 parts by mass or less, and particularly preferably 13 parts by mass or more and 48 parts by mass or less, per 100 parts by mass of the solid content of the composition R.

The fluororesin does not contain a siloxane linkage and at least part of the hydrogen of the alkyl chain of the fluororesin is substituted with fluorine. Examples of the fluororesin include perfluorooctyl acrylate and acrylic-modified perfluoropolyether. The fluororesin may have a (meth)acryloyl group partially substituted with fluorine.

Examples of commercial products of the fluororesin are shown below.

Manufactured by DIC Corporation: MEGAFAC RS-72-K, MEGAFAC RS-75, MEGAFAC RS-76-E, MEGAFAC RS-76-NS, and MEGAFAC RS-77

Manufactured by Daikin Industries, Ltd.: OPTOOL DAC-HP

Manufactured by Solvay Solexis, Inc.: FLUOROLINK MD 700 and FLUOROLINK AD 1700

Manufactured by NEOS Co., Ltd.: FTERGENT 601ADH2

The content of the fluororesin is preferably 0.1 parts by mass or more and 10 mass or less, more preferably 1 part by mass or more and 8 parts by mass or less, and particularly preferably 1.5 parts by mass or more and 7 parts by mass or less, per 100 parts by mass of the solid content of the composition R.

The content of the inorganic oxide fine particles is preferably 1 part by mass or more and 55 parts by mass or less, more preferably 10 parts by mass or more and 50 parts by mass or less, and particularly preferably 12 parts by mass or more and 40 parts by mass or less, per 100 parts by mass of the solid content of the composition R.

The composition R may comprise at least one selected from among a polyfunctional (meth)acrylate compound, a polyfunctional urethane (meth)acrylate compound, and a polyfunctional silicon (meth)acrylate compound. Thanks to this, the cured optical interference layer has a high cross-linking density, and thus has superior hard coating performance. In addition, the transparency of the cured optical interference layer is easily improved. As the polyfunctional (meth)acrylate compound, the polyfunctional urethane (meth)acrylate compound, and the polyfunctional silicon (meth)acrylate compound, for example, those shown as examples for the composition HC can be selected.

The composition R may comprise at least one selected from the group consisting of a reactive acrylic resin, a non-reactive acrylic resin, a polyfunctional urethane acrylate monomer and/or oligomer, a polyfunctional silicon (meth)acrylate monomer or oligomer containing a fluorine atom, a fluororesin, and inorganic oxide fine particles.

The composition R may comprise a reactive acrylic resin and/or a non-reactive acrylic resin, and at least one selected from the group consisting of a polyfunctional urethane acrylate monomer and/or oligomer, a polyfunctional silicon (meth)acrylate monomer or oligomer containing a fluorine atom, a fluororesin, and inorganic oxide fine particles.

(Photopolymerization Initiator)

The composition R preferably comprises a photopolymerization initiator. Thanks to this, polymerization of the active energy ray-curable resin component easily proceeds. As the photopolymerization initiator, for example, those disclosed as examples for the composition HC can be chosen.

Among them, preferred is at least one selected from the group consisting of 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1, and 2,2-dimethoxy-1,2-diphenylethan-1-one.

The amount of the photopolymerization initiator is preferably 0.01 parts by mass or more and 10 parts by mass or less, and more preferably 1 part by mass or more and 10 parts by mass or less, per 100 parts by mass of the solid content of the composition R.

<Solvent>

The composition R may contain a solvent. The solvent is not particularly limited, and is appropriately chosen in consideration of the components contained in the composition, the type of the second support substrate, the application method, etc. As the solvent, those disclosed as examples for the composition HC can be chosen. Among them, ester solvents, ether solvents, alcohol solvents, and ketone solvents are preferable.

<Refractive Index Lowering Component>

The composition R for forming the low refractive index layer preferably contains a refractive index lowering component that lowers the refractive index of the cured optical interference layer. The refractive index lowering component is, for example, particulate (hereinafter, the refractive index lowering particles may be referred to as refractive index lowering particles).

Examples of the refractive index lowering component include hollow silica fine particles. The hollow silica fine particles play a role of lowering the refractive index of the optical interference layer while maintaining the strength of the layer. The hollow silica fine particles are of a structure in which the inside thereof is filled with a gas and/or a porous structure containing a gas. The refractive index is lowered in inverse proportion to the occupancy of the gas. Thus, the hollow silica fine particles have a lower refractive index than the original refractive index of the silica fine particles. Examples of the hollow silica fine particles include THRULYA 4320 (manufactured by JGC Catalysts and Chemicals Ltd.).

As the refractive index lowering component, silica fine particles in which a nanoporous structure is formed on at least part of the inside and/or the surface may be used. The nanoporous structure is formed according to the form, structure, and aggregation state of the silica fine particles and the dispersion state inside the coating film of the silica fine particles.

The average particle diameter of the refractive index lowering particles is preferably 60 nm or more and 200 nm or less. The average particle diameter is a primary particle diameter.

The content of the refractive index lowering component is preferably 35 parts by mass or more and 70 parts by mass or less, and more preferably 37.5 parts by mass or more and 60 parts by mass or less, per 100 parts by mass of the solid content of the composition R. Thanks to this, the cured optical interference layer easily exhibits superior anti-reflection property.

The resin components of the composition HC and the composition R may be the same or different. Among them, both resin components are preferably the same or the same type. This is because adhesion between the uncured hard coat layer and the uncured optical interference layer is improved, and delamination between the layers hardly occurs.

The components contained in the plurality of optical interference layers may be the same or different. The resin components contained in the plurality of optical interference layers may be the same or different.

The high refractive index layer and the medium refractive index layer may comprise a resin component other than the active energy ray-curable type. Examples of the other resin components include thermoplastic resins such as alkyd resins, polyester resins, and acrylic resins; thermosetting resins such as epoxy resins, phenol resins, melamine resins, urethane resins, and silicon resins; and polyisocyanates.

[Laminated Member]

The laminated member is obtained by curing the laminated film. The laminated member is a completely cured product of the laminated film. The laminated member includes a second support substrate, a cured hard coat layer, and a cured optical interference layer in this order. The laminated member may have a plurality of optical interference layers. The laminated member may or may not further have the second support substrate. The second support substrate is peeled off depending on the intended purpose of use.

The laminated member is obtained, for example, by irradiating the laminated film with an active energy ray to cure the uncured hard coat layer and the uncured optical interference layer.

The laminated member is particularly suitable as a protective material for a display and various sensors disposed around the display. Examples of the display include a liquid crystal display, an organic EL display, and a plasma display. The laminated member is particularly suitable as a protective material for a touch panel display for vehicles and devices disposed around the display. The laminated member is disposed such that the optical interference layer is outside the hard coat layer.

(Decorative Layer)

The laminated member may further have a decorative layer. The laminated member includes, for example, a first support substrate, a hard coat layer and a optical interference layer disposed on one main surface of the first support substrate, and a decorative layer disposed on the other main surface of the first support substrate. The decorative layer may be provided on a part of the other main surface of the first support substrate. The decorative layer is a layer that provides decoration, such as a pattern, characters, or metallic luster to the laminated member. The decorative layer enhances the designability of the laminated member.

Examples of the decorative layer include at least one of a print layer and a vapor-deposited layer. Each of the print layer and the vapor-deposited layer has one or more layers, and may include a plurality of layers. The thickness of the decorative layer is not particularly limited, and is appropriately set according to designability, etc.

In the print layer, for example, a wood grain pattern, a stone grain pattern, a cloth grain pattern, a sand grain pattern, a geometric pattern, characters, or a solid print is drawn. The print layer is formed of, for example, a coloring ink comprising a binder resin and a colorant. The binder resin is not particularly limited. Examples of the binder resin include polyvinyl-based resins such as vinyl chloride/vinyl acetate-based copolymers, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins.

The colorant is not particularly limited, and examples thereof include known pigments and dyes. Examples of a yellow pigment include azo-based pigments such as polyazo pigments, organic pigments such as isoindolinone, and inorganic pigments such as titanium nickel antimony oxide. Examples of a red pigment include azo-based pigments such as polyazo pigments, organic pigments such as quinacridone, and inorganic pigments such as rouge. Examples of a blue pigment include organic pigments such as phthalocyanine blue and inorganic pigments such as cobalt blue. Examples of a black pigment include organic pigments such as aniline black. Examples of a white pigment include inorganic pigments such as titanium dioxide.

The vapor-deposited layer is formed of at least one metal selected from the group comprising aluminum, nickel, gold, platinum, chromium, iron, copper, indium, tin, silver, titanium, lead and zinc or an alloy or compound thereof.

(Molded Resin Layer)

The laminated member may further have a molded resin layer. The molded resin layer supports the hard coat layer and the optical interference layer together with the first support substrate. The laminated member comprises, for example, a first support substrate, a hard coat layer and a optical interference layer disposed on one main surface of the first support substrate, and a molded resin layer disposed on the other main surface of the first support substrate. The shape of the molded resin layer is not limited. Thus, the degree of freedom of the design of the laminated member is increased.

The resin that forms the molded resin layer is not particularly limited. The molded resin layer comprises, for example, a thermosetting resin and/or a thermoplastic resin. Examples of the thermosetting resin include phenol resin, epoxy resin, melamine resin, urea resin, unsaturated polyester, and thermosetting polyimide. Examples of the thermoplastic resin include so-called engineering plastics. Examples of the engineering plastics include polyamide, polyacetal, polycarbonate, ultra-high molecular weight polyethylene, polysulfone, polyether sulfone, polyphenylene sulfide, and liquid crystal polymer.

The laminated member may comprise a first support substrate, a hard coat layer and an optical interference layer disposed on one main surface of the first support substrate, a decorative layer disposed on the other main surface of the first support substrate, and a molded resin layer. In this case, the decorative layer is disposed so as to be sandwiched between the first support substrate and the molded resin layer.

B. Method for Manufacturing Laminated Member

The laminated member is manufactured by a method comprising a step of preparing the laminated film, and a step of irradiating the laminated film with an active energy ray having an integral light quantity of 100 m/cm$^2$ or more.

After the step of preparing the laminated film, a decoration step, a preform step, and a main molding step are performed as necessary. The decoration step is preferably performed before the preform step.

The step of irradiating with an active energy ray may be performed a plurality of times. For example, after the decoration step and/or the preform step, a semi-curing step of irradiating part of the laminated film with an active energy ray may be performed. In this case, after the main molding step, a main curing step of irradiating the laminated film with an active energy ray so as to cure the remaining part is performed.

The type of the active energy ray is not particularly limited. The active energy ray is appropriately selected according to the type of the resin component contained in the layer-forming composition. The active energy ray is not particularly limited, and may be an ionizing radiation such as ultraviolet ray, electron beam, α ray, β ray, and γ ray. Among them, ultraviolet rays having a wavelength of 380 nm or less are preferable. Ultraviolet ray is irradiated using, for example, a high-pressure mercury lamp or an ultra-high-pressure mercury lamp.

First Embodiment

A first embodiment of a method for manufacturing a laminated member is as follows.

A manufacturing method comprising:
(i) a step of preparing a laminated film having a first support substrate, an uncured hard coat layer, at least one uncured optical interference layer, and a second support substrate in this order;
(ii) a step of forming a decorative layer on a surface of the first support substrate opposite from the uncured hard coat layer to obtain a laminate body;
(iii) a step of peeling off the second support substrate;
(iv) a step of preforming the laminate body;
(v) a step of irradiating the preformed laminate with an active energy ray having an integral light quantity of 100 mJ/cm$^2$ or more;
(vi) a step of trimming the laminate body; and
(vii) a step of, after the trimming, insert molding a molding resin on the decorative layer side of the laminate body.

Second Embodiment

A second embodiment of the method for manufacturing a laminated member is as follows.

A manufacturing method comprising:
(i) a step of preparing a laminated film having a first support substrate, an uncured hard coat layer, at least one uncured optical interference layer, and a second support substrate in this order;
(ii) a step of forming a decorative layer on a surface of the first support substrate opposite from the uncured hard coat layer to obtain a laminate body;
(iii) a step of peeling off the second support substrate;
(iv) a step of preforming the laminate body;
(v) a step of irradiating the preformed laminate with an active energy ray having an integral light quantity of 1 mJ/cm² or more and less than 100 mJ/cm² to semi-cure the laminate body;
(vi) a step of trimming the laminate body;
(vii) a step of insert molding a molding resin on the decorative layer side of the trimmed laminate body; and
(viii) a step of irradiating the laminate body having the molded resin with an active energy ray having an integral light quantity of 100 mJ/cm² or more.

The second embodiment includes a semi-curing step. Thus, defects during molding such as cracks and wrinkles are further less likely to occur in the laminated member.

Third Embodiment

A third embodiment of a method for manufacturing a laminated member is as follows.

A manufacturing method comprising:
(i) a step of preparing a laminated film having a first support substrate, an uncured hard coat layer, at least one uncured optical interference layer, and a second support substrate in this order;
(ii) a step of forming a decorative layer on a surface of the first support substrate opposite from the uncured hard coat layer to obtain a laminate body;
(iii) a step of preforming the laminate body;
(iv) a step of trimming the laminate body;
(v) a step of peeling off the second support substrate from the trimmed laminate body;
(vi) a step of irradiating with an active energy ray having an integral light quantity of 100 mJ/cm² or more; and
(vii) a step of, after irradiating with the active energy ray, insert molding a molding resin on the decorative layer side.

In the third embodiment, trimming is performed in a state where the laminate has the second support substrate. Thus, scattering of fragments (foreign matters) to the first support substrate during trimming is suppressed. Accordingly, foreign matter marks generated due to the entry of foreign matters into a mold to be used for insert molding are suppressed.

In the following, the respective steps are described in detail.

(Step of Preparing Laminated Film)

A laminated film is prepared. The laminated film is manufactured by the above-described method for manufacturing a laminated film. The laminated film has a first support substrate, an uncured hard coat layer formed on at least one surface of the first support substrate, and an uncured optical interference layer formed on the uncured hard coat layer. A plurality of uncured optical interference layers may be disposed. The laminated film may further have a second support substrate.

(Decoration Step)

When the hard coat layer is disposed on one main surface of the first support substrate, the above-described decorative layer may be formed on the other main surface of the first support substrate before a molding step. The decoration step may be performed before the preparation step or may be performed after the preparation step. From the viewpoint of productivity, the decoration step is desirably performed after the preparation step.

The method for forming the print layer is not particularly limited. Examples of the method for forming the print layer include an offset printing method, a gravure printing method, a screen printing method, a roll coating method, and a spray coating method. The method for forming the vapor-deposited layer is also not particularly limited. Examples of the method for forming the vapor-deposited layer include a vacuum vapor deposition method, a sputtering method, an ion plating method, and a plating method.

The hard coat layer and the optical interference layer are uncured but dry. Thus, each layer has a certain degree of hardness. Thus, squeegee marks or suction marks are less likely to occur, for example, in the printing process.

(Step of Peeling Second Support Substrate)

The second support substrate may be peeled off from the laminated film. In the laminated film, the uncured hard coat layer and the uncured optical interference layer are strongly adhered to each other. Accordingly, when the second support substrate is peeled off, partial peeling of the uncured optical interference layer is suppressed. In addition, air entrapment between the uncured optical interference layer and the uncured hard coat layer is also suppressed. On the other hand, since the second support substrate is easily peeled off from the uncured optical interference layer, the formation of zipping marks is suppressed.

(Preform Step)

In the case of manufacturing a laminated member having a three-dimensional shape, the laminated film may be molded into a shape conforming to a desired three-dimensional shape after the preparation step (further, the decoration step) and before the main molding step. By molding the laminated film into a shape close to a three-dimensional shape in advance, the occurrence of cracks, wrinkles, etc. when the laminated film is then molded into a three-dimensional shape is more easily suppressed. After the preform step, a trimming step of removing unnecessary parts of the laminated film may be performed.

The method of preform is not particularly limited. The preform is performed by, for example, a vacuum molding method, an air-pressure molding method, or a vacuum air-pressure molding method. In the preform, the mold and the laminated film are placed in the same processing chamber. The laminated film is placed such that the first support substrate faces the mold. The laminated film is heated and the processing chamber is brought into a vacuum state and/or a pressurized state. Thanks to this, the laminated film is deformed along the mold. Next, the laminated film is cooled and then removed from the mold.

In the preform, the laminated film may be heat-treated at a temperature of 90° C. or more and 150° C. or less. Since the laminated film according to the present embodiment is hardly cured by heat treatment, the stretch ratio is hardly reduced and the surface of each layer can be smoothened.

(Semi-Curing Step)

Before the main molding step, an active energy ray may be applied such that the laminated film is partly cured. Thanks to this, a semi-cured laminated film is obtained.

The semi-curing step is usually performed after the preform. By the semi-curing step, the stretch ratio required in the preform step and/or the main molding step can be obtained. The integral light quantity of the active energy ray is, for example, 1 mJ/cm$^2$ or more and less than 100 mJ/cm$^2$. After the semi-curing step, a trimming step of removing unnecessary parts of the laminated film may be performed.

(Main Molding Step)

In a main molding step, for example, insert molding is performed. In the insert molding method, for example, the optical interference layer is made to face a mold and a resin for molding is injected against the first support substrate. Thanks to this, the laminated film is shaped into a three-dimensional shape, and a molded resin layer is formed on the other main surface of the first support substrate.

(Main Curing Step)

The laminated film is irradiated with an active energy ray having an integral light quantity of 100 mJ/cm$^2$ or more and the laminated film is thereby completely cured. Thanks to this, a laminated member is obtained. The integral light quantity of the active energy ray may be 5000 mJ/cm$^2$ or less, and may be 3000 mJ/cm$^2$ or less. The active energy ray may be of the same type as or different from that of the semi-curing step.

After the laminated film is completely cured, a trimming step of removing unnecessary parts of the laminated member may be performed.

The embodiments described above are examples, and known treatments, processing steps, etc. may be introduced as desired.

One embodiment of a method for manufacturing a laminated film will be described with reference to drawings. In the illustrated example, there is one uncured optical interference layer, but the present invention is not limited to this.

FIG. 1 is a schematic diagram illustrating part of the lamination step according to the present invention.

In FIG. 1, an uncured hard coat layer 20 is laminated on one surface of a first support substrate 10. This laminate is obtained in a step of forming an uncured hard coat layer. The laminate of the first support substrate 10 and the uncured hard coat layer 20 is conveyed in a flat state from the left side toward the right side in FIG. 1.

On the other hand, an uncured optical interference layer 30 is laminated on one surface of a second support substrate 40. This laminate is obtained in the step of forming an uncured optical interference layer. The laminate of the second support substrate 40 and the uncured optical interference layer 30 is conveyed in a flat state from the left side toward the right side in FIG. 1.

In a lamination step, a surface of the uncured hard coat layer 20 on a side opposite from the first support substrate 10 and a surface of the uncured optical interference layer 30 on a side opposite from the second support substrate 40 are bonded to each other. A pressure of 5 N/cm or more and 150 N/cm or less is applied to the uncured hard coat layer 20 and the uncured optical interference layer 30 by a pair of rollers 50. The temperature of the uncured hard coat layer 20 and the uncured optical interference layer 30 is 0° C. or more and 40° C. or less.

The dimensions in FIG. 1 are merely one embodiment. The position, size, etc. of the pair of rollers 50 in FIG. 1 are examples. Conditions of the rollers, such as position and size, can be appropriately changed according to the use mode, for example, the thickness of the uncured optical interference layer 30, and further rollers and rolls can be added as desired.

By the method for manufacturing a laminated film according to the present embodiment, a laminated film that can be molded even into a complicated shape and can reduce the occurrence of defective products during manufacture of the laminated film and during processing of the laminated film is manufactured. For example, in the laminated film obtained by the manufacturing method according to the present embodiment, abnormalities of respective layers, such as breakage, wrinkles, and twisting, hardly occur.

EXAMPLES

The present invention will be described hereafter in more detail by way of examples, to which the present invention is not intended to be limited. In the examples, "parts" and "%" are on a mass basis unless otherwise indicated.

The components used in the examples and comparative examples in the present description are as follows.

(Reactive Acrylic Resin)

(1) Product name: KRM-9322, manufactured by Daicel-Allnex Ltd., Tg: 60° C., Mw: 50,000

(2) Product name: WEL-355, manufactured by DIC Corporation, Tg: 85° C., Mw: 45,000

(Polyfunctional Urethane Acrylate Oligomer)

Product name: KRM-8452, manufactured by Daicel-Allnex Ltd., Mw: 3884, acrylate equivalent: 120 g/eq (Polyfunctional Silicon Acrylate Oligomer Containing Fluorine Atom)

Product name: Shikoh UV-AF305, manufactured by Mitsubishi Chemical Corporation, Mw: 18000

(Polyfunctional Urethane Acrylate Oligomer)

Product name: H-7M40, manufactured by Negami Chemical Industrial Co., Ltd., Mw: 10000 to 15000

(Polyfunctional Urethane Acrylate Oligomer)

Product name: CN-9893, manufactured by Arkema S.A.

(Polyfunctional Acrylate Oligomer)

Product name: ARONIX M-315, manufactured by Toagosei Co., Ltd., Mw: 450, acrylate equivalent: 150 g/eq (Refractive Index Lowering Component)

Product name: THRULYA 4320 (produced by JGC Catalysts and Chemicals Ltd., hollow silica fine particles)

(Inorganic Oxide Fine Particle)

(1) Product name: OSCAL 1842, manufactured by JGC Catalysts and Chemicals Ltd., particle diameter: 10 nm, reactive silica organosol (2) Product name: HX-204 IP, manufactured by Nissan Chemical Corporation, phosphorus-doped tin oxide sol, particle diameter: 5 nm to 20 nm (Photopolymerization Initiator)

Product name: Omnirad 184, manufactured by IGM RESINS, α-hydroxyalkylphenone (First Support Substrate)

(1) TB1-TB3: product name AW-10U, manufactured by Wavelock Advanced Technology Co., Ltd., two-layer (PMMA/PC) film made of PMMA and PC, TB1: 300 μm in thickness, TB2: 200 μm in thickness, TB3: 500 μm in thickness (2) TB4: product name: Soft Acrylic, manufactured by Kuraray Co., Ltd., acrylic film, thickness: 40 μm (Second Support Substrate (Protective Film))

(1) OPP1: product name: TORAYFAN #40-2500, manufactured by Toray Industries, Inc., biaxially oriented polypropylene film, thickness: 40 μm (2) OPP2: product name: ALPHAN E-201F, manufactured by Oji F-Tex Co., Ltd., biaxially oriented polypropylene film, thickness: 50 Jim (3) PET: product name: Lumirror T60, manufactured by Toray Industries, Inc., biaxially oriented polyester film, thickness: 50 μm

[Preparation of Composition HC1]

In a container containing 185 parts of methyl isobutyl ketone were mixed 47.6 parts by mass of KRM-9322 (reactive acrylic resin), 33.3 parts by mass of KRM-8452 (polyfunctional urethane acrylate oligomer), 14.3 parts by mass of OSCAL 1842 (inorganic oxide fine particles), and 4.8 parts by mass of Omnirad 184 (photopolymerization initiation). Thus, a transparent composition HC1 having a solid concentration of 35% was prepareted.

[Preparation of Compositions HC2 to HC10]

Transparent compositions HC2 to HC10 each having a solid concentration of 35% were prepared in the same manner as for the composition HC1 except for using the formulations shown in Table 1C.

[Preparation of Composition LR1 Having Low Refractive Index]

First, 24.8 parts by mass of KRM-9322 (reactive acrylic resin), 13.3 parts by mass of KRM-8452 (polyfunctional urethane acrylate oligomer), 13.3 parts by mass of Shikoh UV-AF305 (polyfunctional silicon acrylate oligomer containing a fluorine atom), and 4.8 parts by mass of Omnirad 184 (photopolymerization initiation) were mixed. Furthermore, 43.8 parts by mass of THRULYA 4320 (refractive index lowering component) was blended. This mixture was diluted with PGM (solvent) until the solid concentration reached 2%, and thus a transparent composition LR1 was prepareted.

[Preparation of Compositions LR2 to LR3]

Transparent compositions LR2 to LR3 each having a solid concentration of 2% were prepared in the same manner as for the composition LR1 except for using the formulations shown in Table 1A.

[Preparation of Composition HR1 Having High Refractive Index]

A transparent composition HR1 having a solid concentration of 2% was prepared in the same manner as for the composition LR1 except for using the formulation shown in Table 1B.

Example 1

(1) Manufacture of Laminated Film (1-1) Formation of Uncured Hard Coat Layer

The composition HC1 was applied to the PMMA surface of the first support substrate TB1 with a gravure coater such that the thickness after drying was 8 μm. Then, the resultant was dried at 80° C. for 1 minute to volatilize the solvent, thereby forming an uncured hard coat layer.

The surface of the obtained uncured hard coat layer was subjected to a touch test, and then its appearance was observed. There was no change in the outward appearance of the surface of the uncured hard coat layer, and the uncured hard coat layer was evaluated to be tack-free.

Hereinafter, a hard coat layer may be referred to as an "HC layer".

The composition LR1 was applied to an OPP film (second support substrate) with a gravure coater such that the thickness after drying was 90 nm. Then, the resultant was dried at 80° C. for 1 minute to volatilize the solvent, thereby forming an uncured optical interference layer. The surface of the resultant uncured optical interference layer was also tack-free. The second support substrate on which the uncured optical interference layer was formed was wound into a roll form.

Hereinafter, an optical interference layer formed of the composition LR1 having a low refractive index may be referred to as an "LR layer".

(1-3) Lamination of Uncured HC Layer and LR Layer

While the second support substrate wound in a roll form was unwound, the surface of the uncured HC layer supported by the first support substrate and the surface of the uncured LR layer supported by the second support substrate were bonded to each other. The bonding was performed under a pressure of 20 N/cm and a temperature of 25° C. Thus, a laminated film including the first support substrate, the uncured HC layer, the uncured LR layer, and the second support substrate in this order was manufactured.

(2) Manufacture of Laminated Member (2-1) Formation of Print Layer

A print layer was formed on a surface of the first support substrate of the laminated film, on the side opposite from the uncured HC layer, by screen printing, and dried at a drying temperature of 80° C. for 10 minutes. This printing step was repeated 5 times, and then the resultant was dried at 90° C. for 1 hour. A black paint (product name: CZ-805 BLACK (manufactured by NIKKO BICS Co., Ltd.) was used for the formation of the print layer.

(2-2) Peeling of Protective Film

The protective film was then peeled off from the uncured LR layer at a rate of 5.0 mm/sec.

(2-3) Preform

The laminated film with the print layer was heated at 190° C. for 30 seconds, and preform was performed by a vacuum pressure molding method.

(2-4) Main Curing

The preformed laminated film was irradiated with an active energy ray having an integral light quantity of 500 mJ/cm$^2$. Subsequently, trimming was performed.

(2-5) Main Molding

Finally, injection molding was performed, so that a laminated member having a molded resin layer (polycarbonate) on the print layer side of the first support substrate. In the examples, unless otherwise specified, ultraviolet rays are used as active energy rays.

[Evaluation]

The laminated film and the laminated member were evaluated as follows.

(a) Refractive Index

Compositions LR1 to LR3 and composition HR1 were applied to a protective film to achieve a dry thickness of 5 μm. Subsequently, the coating film was irradiated with an active energy ray having an integral light quantity of 500 mJ/cm$^2$ to obtain an evaluation sample. The refractive index of the evaluation sample at a D line of 589 nm was measured using an Abbe refractometer DR-M2 manufactured by Atago Co., Ltd. The evaluation sample was set on the prism surface, and 1-bromonaphthalene was used as the intermediate solution.

(b) Surface Tension of Composition R

The surface tension of the composition was calculated from the shape of a suspended droplet using a pendant drop method. As an analysis method, a d/D method was used. For the measurement, a portable contact angle meter PCA-1 (Kyowa Interface Science Co., Ltd.) and a Teflon (registered trademark)-processed #18 injection needle were used.

(c) Surface Tensions of Second Support Substrate, Uncured HC Layer, and Uncured LR Layer The surface tensions of the second support substrate, the uncured HC layer, and the uncured LR layer were measured by the following method.

Water and methylene iodide were prepared as liquid samples. For each of these liquid samples, a contact angle with respect to the evaluation surface was measured. The contact angle was measured as follows.

Measuring apparatus: DMo-701 (manufactured by Kyowa Interface Science Co., Ltd.)
Control analysis software: FAMAS ver. 5.0.16
Analysis method: θ/2 method
Stainless needle: 18G
Liquid amount: 2 μL
Measurement waiting time: 1000 ms
Number of measurements: 5

The measured contact angles θ were averaged and applied to the Owens Wendt model of the above software to calculate the surface tension of the evaluation surface.

(d) Thickness

An evaluation sample of 10 mm×10 mm was cut out from a laminated member. A cross section of the evaluation sample was exposed with a microtome (LEICA RM2265). The exposed cross section was observed with a laser microscope (VK8700, manufactured by KEYENCE Corporation) or a transmission electron microscope (JEM2100, manufactured by JEOL Ltd.), and the thickness of each 10 points of the HC layer, the LR layer, and the second support substrate was measured. The average values were taken as the thickness of the HC layer and the thickness of the LR layer, respectively.

(e) Luminous Reflectance

The second support substrate was peeled off from the laminated film. Then, a black paint (product name: CZ-805 BLACK (manufactured by NIKKO BICS Co., Ltd.) was applied to a surface of the first support substrate of the laminated film opposite from the uncured HC layer with a bar coater such that a dry film thickness was 3 μm or more and 6 μm or less. Subsequently, the laminated film coated with the black paint was allowed to stand in a room temperature environment for 5 hours and dried to prepare an uncured evaluation sample.

From the LR layer side of the evaluation sample, a luminous reflectance by the SCI method was measured. For the measurement, SD7000 manufactured by Nippon Denshoku Industries Co., Ltd. was used, and the measurement wavelength region was set to 380 nm or more and 780 nm or less.

(f) Stretch Ratio

A test piece having a length of 200 mm×a width of 10 mm was cut out from a laminated film. The test piece was set in a tensile tester having a distance between chucks of 150 mm, and the long side of the evaluation sample was stretched by 50% under the conditions of a tensile force of 5.0 Kgf and a tensile speed of 300 mm/min in a 160° C. atmosphere. The evaluation sample after stretching was observed using a microscope with a magnification of 1000 times or more, and the presence of cracks having a size exceeding 100 μm in length and 1 μm in width was checked.

When no crack occurred, a new evaluation sample was cut out, and then the long side was stretched by 60%. Then, occurrence of cracks was observed in the same procedure. This procedure was repeated while increasing the stretch ratio by 10%. The stretch ratio applied when a crack of the above size was first confirmed was taken as the stretch ratio of the laminated film. The evaluation was performed three times for the evaluation samples cut out from the same laminated film, and the average value of the stretch ratios obtained in each time was taken as the stretch ratio of the laminated film.

(g) Hardness (g-1) Hardness Measurement of Uncured HC Layer

In the same manner as in the formation of uncured hard coat layer (1-1), the composition HC was applied to the first support substrate, and thus an evaluation sample was obtained. The hardness of the HC layer of this evaluation sample was measured.

The hardness was measured by continuous stiffness measurement (method used: Advanced Dynamic E and H.NMT) using iMicro Nanoindenter manufactured by NANOMECHANICS, INC.

Specifically, a minute AC load was superimposed on a quasi-static test load on the surface of the evaluation sample. The load was applied until it reached a maximum load of 50 mN. As an indenter, a berkovich type diamond indenter (tip curvature radius: 20 nm) was used. Continuous stiffness with respect to depth was calculated from the vibration component of the resulting displacement and the phase difference between the displacement and the load, and the profile of hardness with respect to depth was obtained. The maximum hardness at a depth of 50 nm to 100 nm of this profile was calculated.

iMicro-dedicated software was used to calculate the load and stiffness. In calculating the stiffness, the Poisson's ratio of the coating layer was set to 0.35. The load was controlled such that the strain rate $(\partial P/\partial t)/P$ was 0.2. In the analysis with the iMicro-dedicated software, a point provisionally defined on the iMicro-dedicated software at the time of measurement (a point at which d(Force)/d(Disp) was approximately 500 N/m) was set as the surface position of the coating layer.

(g-2) Hardness Measurement from LR Layer Side of Cured Laminated Film

The laminated film from which the second support substrate had been peeled off was irradiated with an active energy ray having an integral light quantity of 500 mJ/cm$^2$, and thus an evaluation sample was prepared. The hardness was measured in the same manner as described above from the LR layer side of this evaluation sample.

(h) Abrasion Resistance

The laminated film from which the second support substrate had been peeled off was irradiated with an active energy ray having an integral light quantity of 500 mJ/cm$^2$, and thus an evaluation sample was prepared. The surface of the LR layer of the evaluation sample was rubbed 5000 times with a friction element to which a cotton cloth was fixed while applying a vertical load of 4.9 N. The surface of the LR layer of the laminated member was visually observed. Subsequently, the surface of the LR layer of the laminated member was rubbed until the number of integrations reached 7000. The surface of the LR layer of the laminated member was visually observed. Evaluation criteria are as follows.

Excellent: No scratches were visually recognized even after 7000 rubs.

Good: No scratches were visually recognized after 5000 rubs, but scratches were visually recognized after 7000 rubs.

Fair: After 5000 rubs, 5 or less scratches were visually recognized.

Poor: After 5000 rubs, many scratches were visually recognized.

(i) Bonding Property Between Uncured HC Layer and LR Layer

The laminated film having the first support substrate and the uncured hard coat layer and the laminated film having the second support substrate and the uncured optical interference layer were bonded to each other while being pressed with a hand roller such that the layers faced each other, and the degree of bonding was evaluated.

Evaluation criteria are as follows.

Good: The films are bonded to each other.

Fair: The films are bonded to each other, but adhesion is weak.

Poor: The films are not bonded to each other at all.

(j) Pencil Hardness

In the same manner as in the formation of uncured hard coat layer (1-1), the composition HC was applied to the first support substrate and then irradiated with an active energy ray having an integral light quantity of 500 $mJ/cm^2$, and thus an evaluation sample was prepared. The pencil hardness of the HC layer of this evaluation sample was measured. Pencil hardness was measured according to JIS K5600-5-4 (1999), Scratch Hardness (the pencil method).

(k) Warpage of Laminated Member

An evaluation sample of 200 mm×200 mm was cut out from the laminated film and irradiated with an active energy ray having an integral light quantity of 500 $mJ/cm^2$. Subsequently, the evaluation sample was placed on a horizontal plane, and the amount of lifting (warpage) of the four corners from the horizontal plane was measured using a ruler and averaged.

Evaluation criteria are as follows.

Excellent: The average amount of warpage is 10 mm or less.

Good: The average amount of warpage is 10 mm or more and less than 15 mm.

Fair: The average amount of warpage is 15 mm or more and less than 20 mm.

Poor: The average amount of warpage is 20 mm or more.

(l) Evaluation of Outward Appearance after Peeling Protective Film

From the above-obtained laminated film having the first support substrate, the uncured HC layer, the uncured LR layer, and the second support substrate in this order was peeled the second support substrate at a speed of 50.0 mm/sec. The optical interference layer after peeling was visually observed and evaluated according to the following evaluation criteria.

Good: There are no peeling marks (streaks, etc.) and foaming marks.

Fair: There are peeling marks (streaks, etc.), but there are no foaming marks.

Poor: There are peeling marks (streaks, etc.) and foaming marks.

(m) Evaluation of Outward Appearance of Laminated Member

The laminated member was observed using a microscope with a magnification of 1000 times or more, and the presence of scratches having a size exceeding 100 μm in length and 1 μm in width was checked.

Good: There are no scratches.

Poor: There are scratches.

(n) Handleability after Preform

The preformed laminated film was irradiated with an active energy ray having an integral light quantity of 500 $mJ/cm^2$ to obtain an evaluation sample. The handleability when setting the evaluation sample in a mold for injection molding was evaluated.

Evaluation criteria are as follows.

Good: The evaluation sample has stiffness, and can be easily placed in an injection molding mold.

Fair: The stiffness of the evaluation sample is weak, and there is some difficulty in handling, but it can be placed in a mold.

Poor: The stiffness of the evaluation sample is weak, and the evaluation sample cannot be placed in a mold.

(o) Outward Appearance after Printing Step

The laminated film after peeling off the protective film (2-2) and before the preform (2-3) was used as an evaluation sample. The presence of squeegee marks and suction marks due to the printing process of the evaluation sample was visually checked.

Evaluation criteria are as follows.

Excellent: There are no squeegee marks and no suction marks.

Good: There are slight squeegee marks and suction marks, but they are leveled and disappeared by heating to 90° C. or more.

Fair: There are slight squeegee marks and suction marks, but they are leveled and disappeared by heating to 150° C. or more.

Bad: There are squeegee marks and suction marks.

(p) Chemical Resistance

In the same manner as in the formation of uncured hard coat layer (1-1), the composition HC was applied to the first support substrate and then irradiated with an active energy ray having an integral light quantity of 500 $mJ/cm^2$, and thus a sample was prepared. From the resulting sample was cut out an evaluation sample of 10 cm×10 cm. Throughout one surface of the HC layer of the evaluation sample was applied 2 g of Neutrogena SUNSCREEN SPF 45 (manufactured by Johnson & Johnson) uniformly with a finger. Subsequently, the sample was warmed at 80° C. for 4 hours. Then, the sample was cooled to room temperature, washed with water, and the appearance of the LR layer was visually evaluated.

Evaluation criteria are as follows.

Excellent: No appearance abnormality was observed.

Good: Applied marks are recognized, but lifting is not recognized.

Fair: Slight lifting is recognized.

Poor: Severe lifting occurred.

Examples 2 to 21

In the same manner as in Example 1, laminated films and laminated members having the configurations shown in Table 2A and Table 2B were prepared using compositions prepared with the formulations shown in Table 1A, Table 1B, and Table 1C. The laminated films and the laminated members obtained were evaluated in the same manner as in Example 1. The results are shown in Tables 2A and 2B. In any of the examples, the surfaces of the uncured hard coat layer and the uncured optical interference layer obtained were tack-free.

TABLE 1A

|  |  |  | LR1 | LR2 | LR5 |
|---|---|---|---|---|---|
| Composition having low refractive index | Reactive acrylic resin | KRM-9322 | 24.8 | 24.8 |  |
|  | Reactive acrylic resin | WEL-355 |  |  |  |
|  | Polyfunctional urethane acrylate oligomer | KRM-8452 | 13.3 | 13.3 |  |
|  | Polyfunctional silicon acrylate oligomer containing fluorine atom | Shikoh UV-AF305 | 13.3 | 13.3 | 15.71 |
|  | Polyfunctional urethane acrylate oligomer | H-7M40 |  |  | 13.09 |
|  | Refractive index lowering component | THRULYA 4320 | 43.8 | 43.8 | 70.1 |
|  | Photopolymerization initiator | Omnirad 184 | 4.8 | 4.8 | 1.1 |
|  | Total |  | 100 | 100 | 100 |
|  | Diluent solvent |  | PGM | DAA | PGM |
|  | (b) Surface tension yLO (mN/m) |  | 23 | 28 | 24 |
|  | (a) Refractive index after curing |  | 1.37 | 1.37 | 1.29 |

TABLE 1B

|  |  |  | HR1 |
|---|---|---|---|
| Composition having high or medium refractive index | Reactive acrylic resin | KRM-9322 | 8.9 |
|  | Polyfunctional urethane acrylate oligomer | KRM-8452 | 2.7 |
|  | Inorganic oxide fine particle | HX-204 1P | 86.5 |
|  | Photopolymerization initiator | Omnirad 184 | 1.8 |
|  | Total |  | 100.0 |
|  | (b) Surface tension (mN/m) |  | 25.0 |
|  | (a) Refractive index after curing |  | 1.76 |

TABLE 1C

|  |  |  | HC1 | HC2 | HC3 | HC4 | HC5 | HC6 | HC7 | HC8 | HC9 | HC10 |
|---|---|---|---|---|---|---|---|---|---|---|---|---|
| Composition for forming hard coat layer | Reactive acrylic resin | KRM-9322 | 47.6 | 31.9 | 54.6 | 27.6 | 67.6 |  | 17.2 | 54.2 | 15.0 | 70.0 |
|  | Polyfunctional urethane acrylate oligomer | KRM-8452 | 33.3 | 33.3 | 33.3 | 53.3 | 13.3 |  | 33.0 | 38.0 | 65.9 | 10.9 |
|  | Inorganic oxide fine particle | OSCAL-1842 | 14.3 | 30.0 | 7.3 | 14.3 | 14.3 |  | 45.0 | 3.0 | 14.3 | 14.3 |
|  | Polyfunctional urethane acrylate oligomer | CN-9893 |  |  |  |  |  | 71.4 |  |  |  |  |
|  | Polyfunctional acrylate oligomer | M-315 |  |  |  |  |  | 23.8 |  |  |  |  |
|  | Photopolymerization initiator | Omnirad 184 | 4.8 | 4.8 | 4.8 | 4.8 | 4.8 | 4.8 | 4.8 | 4.8 | 4.8 | 4.8 |
|  | Total |  | 100.0 | 100.0 | 100.0 | 100.0 | 100.0 | 100.0 | 100.0 | 100.0 | 100.0 | 100.0 |

TABLE 2A

|  | Examples |  | 1 | 2 | 3 | 4 | 5 |
|---|---|---|---|---|---|---|---|
|  | Lamination method |  | Lamination | Lamination | Lamination | Lamination | Lamination |
| Laminated film | Second support substrate | Type | TORAYFAN | TORAYFAN | TORAYFAN | TORAYFAN | TORAYFAN |
|  |  | Thickness (μm) | 40 | 40 | 40 | 40 | 40 |
|  |  | (c) Surface tension (mN/m) | 36 | 36 | 36 | 36 | 36 |
|  | LR layer | No. | LR1 | LR1 | LR2 | LR1 | LR1 |
|  |  | (d) Thickness (nm) | 95 | 170 | 70 | 95 | 95 |
|  |  | Refractive index | 1.37 | 1.37 | 1.37 | 1.37 | 1.37 |
|  |  | (c) Surface tension (mN/m) | 50 | 50 | 50 | 50 | 50 |
|  | HR layer | No. | — | — | — | — | — |
|  |  | (d) Thickness (nm) | — | — | — | — | — |
|  |  | (c) Surface tension (mN/m) | — | — | — | — | — |
|  | Hard coat layer | No. | HC1 | HC1 | HC1 | HC1 | HC1 |
|  |  | (d) Thickness (μm) | 8 | 8 | 8 | 8 | 8 |
|  |  | (c) Surface tension (mN/m) | 45 | 45 | 45 | 45 | 45 |
|  |  | (g) Uncured hardness (Gpa) | 0.3 | 0.3 | 0.3 | 0.3 | 0.3 |
|  | First support substrate | Thickness (μm) | 300 | 300 | 300 | 500 | 200 |
|  | Surface tension relationship | y2 ≤ yL$_1$ | Satisfy | Satisfy | Satisfy | Satisfy | Satisfy |
|  |  | \|y2-yL$_1$\| > \|yH$_1$-yL$_1$\| | Satisfy | Satisfy | Satisfy | Satisfy | Satisfy |
| Evaluation item | (e) Luminous reflectance (%) |  | 2.4 | 2.6 | 3.7 | 2.4 | 2.4 |
|  | (f) Stretch ratio (%) |  | ≥50% | ≥50% | ≥50% | ≥50% | ≥50% |
|  | (g) Hardness (Gpa) of laminated member |  | 0.8 | 0.8 | 0.8 | 0.8 | 0.8 |
|  | (h) Abrasion resistance |  | Good | Good | Good | Good | Good |
|  | (i) Bonding property |  | Good | Good | Good | Good | Good |
|  | (j) Pencil hardness |  | 2H | 2H | 2H | 3H | 2H |

TABLE 2A-continued

| | | | | | | | |
|---|---|---|---|---|---|---|---|
| | (k) Warpage of laminated member | | Excellent | Excellent | Excellent | Excellent | Excellent |
| | (l) Evaluation of appearance after protective film is peeled | | Good | Good | Good | Good | Good |
| | (m) Evaluation of appearance of laminated member | | Good | Good | Good | Good | Good |
| | (n) Handleability after preforming | | Good | Good | Good | Good | Good |
| | (o) Appearance after printing step | | Excellent | Excellent | Excellent | Excellent | Excellent |
| | (p) Chemical resistance | | Good | Good | Good | Good | Good |

| | | Examples | 6 | 7 | 8 | 9 | 10 |
|---|---|---|---|---|---|---|---|
| | Lamination method | | Lamination | Lamination | Lamination | Lamination | Lamination |
| Laminated film | Second support substrate | Type | TORAYFAN | TORAYFAN | TORAYFAN | TORAYFAN | ALPHAN |
| | | Thickness (μm) | 40 | 40 | 40 | 40 | 50 |
| | | (c) Surface tension (mN/m) | 36 | 36 | 36 | 36 | 32 |
| | LR layer | No. | — | LR1 | LR1 | LR1 | LR1 |
| | | (d) Thickness (nm) | — | 95 | 95 | 95 | 95 |
| | | Refractive index | | 1.37 | 1.37 | 1.37 | 1.37 |
| | | (c) Surface tension (mN/m) | 50 | 50 | 50 | 50 | 50 |
| | HR layer | No. | HR1 | HR1 | — | — | — |
| | | (d) Thickness (nm) | 20 | 20 | — | — | — |
| | | (c) Surface tension (mN/m) | 50 | 50 | — | — | — |
| | Hard coat layer | No. | HC1 | HC1 | HC1 | HC1 | HC1 |
| | | (d) Thickness (μm) | 8 | 8 | 23 | 3 | 8 |
| | | (c) Surface tension (mN/m) | 45 | 45 | 45 | 45 | 45 |
| | | (g) Uncured hardness (Gpa) | 0.3 | 0.3 | 0.3 | 0.3 | 0.3 |
| | First support substrate | Thickness (μm) | 300 | 300 | 300 | 300 | 300 |
| | Surface tension relationship | $y2 \leq yL_1$ | Satisfy | Satisfy | Satisfy | Satisfy | Satisfy |
| | | $|y2-yL_1| > |yH_1-yL_1|$ | Satisfy | Satisfy | Satisfy | Satisfy | Satisfy |
| Evaluation item | (e) Luminous reflectance (%) | | 9.7 | 0.6 | 2.4 | 2.4 | 2.4 |
| | (f) Stretch ratio (%) | | ≥50% | ≥50% | ≥50% | ≥50% | ≥50% |
| | (g) Hardness (Gpa) of laminated member | | 0.8 | 0.8 | 1.0 | 0.8 | 0.8 |
| | (h) Abrasion resistance | | Good | Good | Good | Good | Good |
| | (i) Bonding property | | Good | Good | Good | Good | Good |
| | (j) Pencil hardness | | 2H | 2H | 3H | H | 2H |
| | (k) Warpage of laminated member | | Excellent | Excellent | Good | Excellent | Excellent |
| | (l) Evaluation of appearance after protective film is peeled | | Good | Good | Good | Good | Good |
| | (m) Evaluation of appearance of laminated member | | Good | Good | Good | Good | Good |
| | (n) Handleability after preforming | | Good | Good | Good | Good | Good |
| | (o) Appearance after printing step | | Excellent | Excellent | Excellent | Excellent | Excellent |
| | (p) Chemical resistance | | Good | Good | Good | Good | Good |

TABLE 2B

| | | Examples | 11 | 12 | 13 | 14 |
|---|---|---|---|---|---|---|
| | Lamination method | | Lamination | Lamination | Lamination | Lamination |
| Laminated film | Second support substrate | Type | TORAYFAN | TORAYFAN | TORAYFAN | TORAYFAN |
| | | Thickness (μm) | 40 | 40 | 40 | 40 |
| | | (c) Surface tension (mN/m) | 36 | 36 | 36 | 36 |
| | LR layer | No. | LR2 | LR1 | LR1 | LR1 |
| | | (d) Thickness (nm) | 95 | 95 | 95 | 95 |
| | | Refractive index | 1.37 | 1.37 | 1.37 | 1.37 |
| | | (c) Surface tension (mN/m) | 50 | 50 | 50 | 50 |
| | HR layer | No. | — | — | — | — |
| | | (d) Thickness (nm) | — | — | — | — |
| | | (c) Surface tension (mN/m) | — | — | — | — |
| | Hard coat layer | No. | HC1 | HC2 | HC3 | HC4 |
| | | (d) Thickness (μm) | 8 | 8 | 8 | 8 |
| | | (c) Surface tension (mN/m) | 45 | 40 | 48 | 45 |
| | | (g) Uncured hardness (Gpa) | 0.3 | 0.3 | 0.2 | 0.2 |
| | First support substrate | Thickness (μm) | 300 | 300 | 300 | 300 |
| | Surface tension relationship | $y2 \leq yL_1$ | Satisfy | Satisfy | Satisfy | Satisfy |
| | | $|y2-yL_1| > |yH_1-yL_1|$ | Satisfy | Satisfy | Satisfy | Satisfy |
| Evaluation item | (e) Luminous reflectance (%) | | 2.4 | 2.4 | 2.4 | 2.5 |
| | (f) Stretch ratio (%) | | ≥50% | ≥50% | ≥50% | ≥50% |
| | (g) Hardness (Gpa) of laminated member | | 0.8 | 0.9 | 0.7 | 1.0 |
| | (h) Abrasion resistance | | Good | Good | Good | Good |
| | (i) Bonding property | | Good | Good | Good | Good |
| | (j) Pencil hardness | | 2H | 3H | 2H | 311 |

TABLE 2B-continued

| | | | | | | |
|---|---|---|---|---|---|---|
| | (k) Warpage of laminated member | | Excellent | Excellent | Excellent | Excellent |
| | (l) Evaluation of appearance after protective film is peeled | | Good | Good | Good | Good |
| | (m) Evaluation of appearance of laminated member | | Good | Good | Good | Good |
| | (n) Handleability after preforming | | Good | Good | Good | Good |
| | (o) Appearance after printing step | | Excellent | Excellent | Excellent | good |
| | (p) Chemical resistance | | Good | Good | Good | Good |

| | | | Examples | | | |
|---|---|---|---|---|---|---|
| | | | 15 | 16 | 17 | 18 |
| Laminated film | Lamination method | | Lamination | Lamination | Lamination | Lamination |
| | Second support substrate | Type | TORAYFAN | TORAYFAN | TORAYFAN | T60 |
| | | Thickness (μm) | 40 | 40 | 40 | 50 |
| | | (c) Surface tension (mN/m) | 36 | 36 | 36 | 50 |
| | LR layer | No. | LR1 | LR1 | LR1 | LR1 |
| | | (d) Thickness (nm) | 95 | 95 | 95 | 95 |
| | | Refractive index | 1.37 | 1.37 | 1.37 | 1.37 |
| | | (c) Surface tension (mN/m) | 50 | 50 | 50 | 50 |
| | HR layer | No. | — | — | — | — |
| | | (d) Thickness (nm) | — | — | — | — |
| | | (c) Surface tension (mN/m) | — | — | — | — |
| | Hard coat layer | No. | HC5 | HC1 | HC1 | HC1 |
| | | (d) Thickness (μm) | 8 | 1.5 | 35 | 35 |
| | | (c) Surface tension (mN/m) | 45 | 45 | 45 | 45 |
| | | (g) Uncured hardness (Gpa) | 0.4 | 0.3 | 0.3 | 0.3 |
| | First support substrate | Thickness ((μm) | 300 | 300 | 300 | 300 |
| | Surface tension relationship | $y2 \leq yL_1$ | Satisfy | Satisfy | Satisfy | Not satisfy |
| | | $|y2-yL_1| > |yH_1-yL_1|$ | Satisfy | Satisfy | Satisfy | Not satisfy |
| Evaluation item | (e) Luminous reflectance (%) | | 2.4 | 2.4 | 2.4 | 4.5 |
| | (f) Stretch ratio (%) | | ≥50% | ≥50% | ≥50% | ≥50% |
| | (g) Hardness (Gpa) of laminated member | | 0.6 | 0.8 | 0.8 | 0.8 |
| | (h) Abrasion resistance | | Good | Good | Good | Good |
| | (i) Bonding property | | Good | Good | Good | Good |
| | (j) Pencil hardness | | H | F | 4H | 2H |
| | (k) Warpage of laminated member | | Excellent | Excellent | Fair | Excellent |
| | (l) Evaluation of appearance after protective film is peeled | | Good | Good | Good | Fair |
| | (m) Evaluation of appearance of laminated member | | Good | Good | Good | Good |
| | (n) Handleability after preforming | | Good | Good | Good | Good |
| | (o) Appearance after printing step | | Excellent | Good | Good | Good |
| | (p) Chemical resistance | | Good | Good | Good | Good |

| | | | Examples | | |
|---|---|---|---|---|---|
| | | | 19 | 20 | 21 |
| Laminated film | Lamination method | | Lamination | Lamination | Lamination |
| | Second support substrate | Type | TORAYFAN | TORAYFAN | TORAYFAN |
| | | Thickness (μm) | 40 | 40 | 40 |
| | | (c) Surface tension (mN/m) | 36 | 36 | 36 |
| | LR layer | No. | LR1 | LR1 | LR1 |
| | | (d) Thickness (nm) | 95 | 95 | 95 |
| | | Refractive index | 1.37 | 1.37 | 1.37 |
| | | (c) Surface tension (mN/m) | 50 | 50 | 50 |
| | HR layer | No. | — | — | — |
| | | (d) Thickness (nm) | — | — | — |
| | | (c) Surface tension (mN/m) | — | — | — |
| | Hard coat layer | No. | HC7 | HC8 | HC9 |
| | | (d) Thickness (μm) | 8 | 8 | 8 |
| | | (c) Surface tension (mN/m) | 32 | 55 | 45 |
| | | (g) Uncured hardness (Gpa) | 0.3 | 0.3 | 0.05 |
| | First support substrate | Thickness ((μm) | 300 | 300 | 300 |
| | Surface tension relationship | $y2 \leq yL_1$ | Satisfy | Satisfy | Satisfy |
| | | $|y2-yL_1| > |yH_1-yL_1|$ | Not satisfy | Satisfy | Satisfy |
| Evaluation item | (e) Luminous reflectance (%) | | 4.6 | 2.5 | 2.4 |
| | (f) Stretch ratio (%) | | ≥50% | ≥50% | ≥50% |
| | (g) Hardness (Gpa) of laminated member | | 0.8 | 0.8 | 0.6 |
| | (h) Abrasion resistance | | Good | Good | Good |
| | (i) Bonding property | | Good | Good | Good |
| | (j) Pencil hardness | | H | H | 3H |
| | (k) Warpage of laminated member | | Excellent | Excellent | Excellent |
| | (l) Evaluation of appearance after protective film is peeled | | Fair | Good | Good |
| | (m) Evaluation of appearance of laminated member | | Good | Good | Good |

TABLE 2B-continued

| (n) Handleability after preforming | Good | Good | Good |
| (o) Appearance after printing step | Good | Good | Fair |
| (p) Chemical resistance | Good | Good | Good |

Comparative Example 1

An uncured HC layer was formed on the first support substrate in the same manner as in Example 1 except that the composition HC6 was used. Next, the HC layer was irradiated with an active energy ray with an integral light quantity of 500 mJ/cm$^2$ and the HC layer was thereby cured. The composition LR5 was applied to the cured HC layer. Subsequently, the composition LR5 was dried to form an LR layer having a dry thickness of 95 nm. Finally, the LR layer was irradiated with an active energy ray with an integral light quantity of 500 mJ/cm$^2$ to obtain a precure type laminated film. Using the resulting laminated film, a laminated member was prepared and evaluated in the same manner as in Example 1. The results are shown in Table 3.

Comparative Example 2

An uncured HC layer was formed on the first support substrate in the same manner as in Example 1, and then dried. To the uncured HC layer was then applied the composition LR1. Subsequently, the composition LR1 was dried to form an LR layer having a designed dry thickness of 95 nm. Finally, the LR layer was irradiated with an active energy ray with an integral light quantity of 500 mJ/cm$^2$ to obtain a laminated film. Using the resulting laminated film, a laminated member was prepared and evaluated in the same manner as in Example 1. The results are shown in Table 3.

Comparative Example 3

An uncured HC layer was formed on the first support substrate in the same manner as in Example 1, and then dried. The composition LR1 was applied to the uncured HC layer, and then dried. A laminated member was prepared and evaluated in the same manner as in Example 1 except that a laminated film was thus obtained. The results are shown in Table 3A. The thickness of the uncured LR layer could not be measured.

Comparative Example 4 to Comparative Example 5

In the same manner as in Example 1, laminated films and laminated members having the configurations shown in Table 3 were prepared using compositions prepared with the formulations shown in Table 1A, Table 1B, and Table 1C. The laminated films and the laminated members obtained were evaluated in the same manner as in Example 1. The results are shown in Table 3.

TABLE 3

| | Comparative Examples | | 1 | 2 | 3 | 4 | 5 |
|---|---|---|---|---|---|---|---|
| | Lamination method | | Coating (Precure) | Coating (After-cure) | Lamination | Lamination | Lamination |
| Laminated film | Second support substrate | Type | — | — | TORAYFAN | TORAYFAN | TORAYFAN |
| | | Thickness (μm) | — | — | 40 | 40 | 40 |
| | | (c) Surface tension (mN/m) | — | — | 36 | 36 | 36 |
| | LR layer | No. | LR5 | LR1 | LR1 | LR1 | LR1 |
| | | (d) Thickness (nm) | 100 | (Designed film thickness: 95 nm) | 10 | 210 | 95 |
| | | Refractive index | 1.30 | 1.37 | 1.37 | 1.37 | 1.37 |
| | | (c) Surface tension (mN/m) | — | — | 50 | 50 | 50 |
| | HR layer | No. | — | — | — | — | — |
| | | (d) Thickness (nm) | — | — | — | — | — |
| | | (c) Surface tension (mN/m) | — | — | — | — | — |
| | Hard coat layer | No. | HC6 | HC01 | HC1 | HC1 | HC1 |
| | | (d) Thickness (μm) | 3 | 8 | 8 | 8 | 8 |
| | | (c) Surface tension (mN/m) | — | 45 | 45 | 45 | 45 |
| | | (g) Uncured hardness (Gpa) | — | 0.3 | 0.3 | 0.3 | 0.3 |
| | First support substrate | Thickness (μm) | 300 | 300 | 300 | 300 | 30 |
| | Surface tension relationship | $y2 \leq yL_1$ | — | — | Satisfy | Satisfy | Satisfy |
| | | $|y2-yL_1| > |yH_1-yL_1|$ | — | — | Satisfy | Satisfy | Satisfy |
| Evaluation item | | (e) Luminous reflectance (%) | 2.0 | 5.0 | 4.9 | 4.5 | 2.4 |
| | | (f) Stretch ratio (%) | ≥50% | ≥50% | ≥50% | ≥50% | ≥50% |
| | | (g) Hardness (Gpa) of laminated member | 0.8 | 0.8 | 0.8 | 0.8 | 0.8 |
| | | (h) Abrasion resistance | Poor | Good | Good | Good | Good |
| | | (i) Bonding property | — | — | Good | Good | Good |
| | | (j) Pencil hardness | H | 2H | 2H | 2H | H |

TABLE 3-continued

| Comparative Examples | 1 | 2 | 3 | 4 | 5 |
|---|---|---|---|---|---|
| (k) Warpage of laminated member | Excellent | Excellent | Excellent | Excellent | Good |
| (l) Evaluation of appearance after protective film is peeled | Good | Good | Good | Good | Good |
| (m) Evaluation of appearance of laminated member | Poor | Good | Good | Good | Good |
| (n) Handleability after preforming | Good | Good | Good | Good | Poor |
| (o) Appearance after printing step | Excellent | Good | Excellent | Excellent | Good |
| (p) Chemical resistance | Poor | Good | Good | Good | Good |

As can be seen from Tables 2A and 2B, the laminated film according to the present embodiment can be molded even into a complicated shape, and suppresses the occurrence of defective products during molding. In addition, the laminated member according to the present embodiment has superior hard coat performance, for example, high hardness, abrasion resistance, chemical resistance, etc., and desired reflectivity. Furthermore, the laminated film according to the present embodiment has good adhesion between the uncured hard coat layer and the uncured optical interference layer, and can suppress air entrapment.

The laminated film of Comparative Example 1 is of a precure type. Thus, each layer is constituted of a composition so as to enable three-dimensional molding after curing. Therefore, the crosslinking density of the composition after curing is low, and the abrasion resistance and the chemical resistance are poor.

In Comparative Example 2, the composition LR1 was directly applied to the uncured HC layer. For this reason, a mixed phase occurred between the layers, so that desired reflectivity was not obtained. Also in Comparative Examples 3 and 4, desired reflectivity was not obtained. Since Comparative Example 5 has a thin first support substrate, it is inferior in handleability.

INDUSTRIAL APPLICABILITY

According to the present invention, it is possible to provide a laminated film that can be molded into a complicated shape. Therefore, this laminated film is preferably used particularly for manufacturing a protective material for a display.

This application claims priority based on Japanese Patent Application No. 2019-138314, which was filed in Japan on Jul. 26, 2019, the disclosure of which application is incorporated herein by reference in its entirety.

REFERENCE SIGNS LIST

10: First support substrate
20: Uncured hard coat layer
30: Uncured optical interference layer
40: Second support substrate
50: Roller

The invention claimed is:

1. A method for manufacturing a laminated film comprising:
a step of forming an uncured hard coat layer by applying an active energy-ray curable composition for forming a hard coat layer to one side of a first support substrate having a thickness of 50 μm or more and 600 μm or less, and then drying the composition;
a step of forming an uncured optical interference layer by applying an active energy-ray curable composition for forming an optical interference layer on one surface of a second support substrate so that the thickness of the uncured optical interference layer is between 15 nm or more and 200 nm or less, and then drying the composition; and
a lamination step of laminating a surface of the uncured hard coat layer opposite the first support substrate and a surface of the uncured optical interference layer opposite the second support substrate to obtain the laminated film, wherein
a stretch ratio of the laminated film at 160° C. is 50% or more, and
a surface tension γ2 of the one surface of the second support substrate, a surface tension $\gamma L_1$ of the uncured optical interference layer, and a surface tension $\gamma H_1$ of the uncured hard coat layer satisfy relationships of the following formulas 1 and 2:

$$\gamma 2 \leq \gamma L_1 \qquad \text{(Formula 1)}$$

$$|\gamma 2 - \gamma L_1| > |\gamma H_1 - \gamma L_1|. \qquad \text{(Formula 2)}$$

2. The method for manufacturing the laminated film according to claim 1, wherein
a luminous reflectance including regular reflected light measured from an uncured optical interference layer side of the laminated film is 0.1% or more and 4.0% or less, or 6.0% or more and 10.0% or less.

3. The method for manufacturing the laminated film according to claim 1, wherein
a hardness HHb of the uncured hard coat layer measured by a nanoindentation method is 0.1 GPa or more and 0.4 GPa or less.

4. The method for manufacturing the laminated film according to claim 1, wherein
a surface tension γ2 of the one surface of the second support substrate is 28 mN/m or more and 45 mN/m or less.

5. The method for manufacturing the laminated film according to claim 1, wherein
a surface tension $\gamma H_1$ of the uncured hard coat layer is 40 mN/m or more.

6. The method for manufacturing the laminated film according to claim 1, wherein
a hardness HLa measured by a nanoindentation method from the optical interference layer side of the laminated film irradiated with an active energy ray having an integral light quantity of 500 mJ/cm$^2$ is more than 0.5 GPa and 1.2 GPa or less.

7. The method for manufacturing the laminated film according to claim 1, wherein
in the step of forming the uncured hard coat layer, the composition for forming a hard coat layer is applied such that a thickness of the uncured hard coat layer is 2 μm or more and 30 μm or less.

8. A method for manufacturing a laminated member comprising:

a step of preparing the laminated film according to claim 1; and a step of irradiating the laminated film with an active energy ray having an integral light quantity of 100 m/cm² or more.

* * * * *